(12) United States Patent
Zalewski et al.

(10) Patent No.: US 6,542,926 B2
(45) Date of Patent: Apr. 1, 2003

(54) SOFTWARE PARTITIONED MULTI-PROCESSOR SYSTEM WITH FLEXIBLE RESOURCE SHARING LEVELS

(75) Inventors: Stephen H. Zalewski, Nashua, NH (US); Andrew H. Mason, Hollis, NH (US); Gregory H. Jordan, Hollis, NH (US); Karen L. Noel, Pembroke, NH (US)

(73) Assignee: Compaq Information Technologies Group, L.P., Houston, TX (US)

( * ) Notice: Subject to any disclaimer, the term of this patent is extended or adjusted under 35 U.S.C. 154(b) by 71 days.

(21) Appl. No.: 09/095,521

(22) Filed: Jun. 10, 1998

(65) Prior Publication Data

US 2002/0052914 A1 May 2, 2002

(51) Int. Cl.[7] .............................................. G06F 15/167
(52) U.S. Cl. ...................... 709/213; 709/214; 709/215; 712/11
(58) Field of Search ................................. 709/213, 214, 709/215, 218, 220, 221, 226, 229, 104, 100, 102, 103; 711/147; 712/1, 11

(56) References Cited

U.S. PATENT DOCUMENTS

| 4,853,843 | A |   | 8/1989 | Ecklund |
| 5,237,566 | A |   | 8/1993 | Brand et al. ................... 370/61 |
| 5,325,517 | A | * | 6/1994 | Baker et al. ................... 714/11 |
| 5,392,397 | A | * | 2/1995 | Elko et al. ................... 711/152 |
| 5,408,649 | A |   | 4/1995 | Beshears et al. |

(List continued on next page.)

FOREIGN PATENT DOCUMENTS

| EP | 0 321 694 A2 | 6/1989 |
| EP | 0 593 874 A2 | 4/1994 |
| WO | WO88/01772 | 3/1988 |
| WO | WO96/07257 | 3/1996 |
| WO | WO97/04388 | 2/1997 |

OTHER PUBLICATIONS

Beck, "AAMP: A Multiprocessor Approach for Operating System and Application Migration," *Operating Systems Review* 24:41–55 (Apr. 1990).

(List continued on next page.)

*Primary Examiner*—Mark H. Rinehart
*Assistant Examiner*—Beatriz Prieto
(74) *Attorney, Agent, or Firm*—Conley Rose, P.C.

(57) ABSTRACT

Multiple instances of operating systems execute cooperatively in a single multiprocessor computer wherein all processors and resources are electrically connected together. The single physical machine with multiple physical processors and resources is subdivided by software into multiple partitions, each running a distinct copy, or instance, of an operating system. Each of the partitions has access to its own physical resources plus resources designated as shared. The partitioning is performed by assigning all resources with a configuration tree. None, some, or all, resources may be designated as shared among multiple partitions. Each individual operating instance will generally be assigned the resources it needs to execute independently and these resources will be designated as "private." Other resources, particularly memory, can be assigned to more than one instance and shared. Shared memory is cache coherent so that instances may be tightly coupled, and may share resources that are normally allocated to a single instance. This allows previously distributed user or operating system applications which usually must pass messages via an external interconnect to operate cooperatively in the shared memory without the need for either an external interconnect or message passing. Examples of application that could take advantage of this capability include distributed lock managers and cluster interconnects. Newly-added resources, such as CPUs and memory, can be dynamically assigned to different partitions and used by instances of operating systems running within the machine by modifying the configuration.

48 Claims, 15 Drawing Sheets

U.S. PATENT DOCUMENTS

| | | | | |
|---|---|---|---|---|
| 5,414,851 A | * | 5/1995 | Brice, Jr. et al. | 709/104 |
| 5,471,609 A | | 11/1995 | Yudenfriend et al. | |
| 5,481,707 A | | 1/1996 | Murphy, Jr. et al. | |
| 5,481,719 A | | 1/1996 | Ackerman et al. | |
| 5,517,648 A | | 5/1996 | Bertone et al. | |
| 5,537,574 A | * | 7/1996 | Elko et al. | 711/141 |
| 5,544,345 A | * | 8/1996 | Carpenter et al. | 711/150 |
| 5,546,579 A | * | 8/1996 | Josten et al. | 707/8 |
| 5,574,914 A | | 11/1996 | Hancock et al. | 395/650 |
| 5,583,987 A | | 12/1996 | Kobayashi et al. | |
| 5,588,111 A | | 12/1996 | Cutts, Jr. et al. | |
| 5,588,138 A | * | 12/1996 | Bai et al. | 711/173 |
| 5,606,696 A | | 2/1997 | Ackerman et al. | |
| 5,613,146 A | | 3/1997 | Gove et al. | 395/800 |
| 5,625,831 A | * | 4/1997 | Priest et al. | 713/500 |
| 5,636,341 A | | 6/1997 | Matsushita et al. | |
| 5,640,584 A | | 6/1997 | Kandasamy et al. | |
| 5,684,993 A | * | 11/1997 | Willman | 709/107 |
| 5,692,193 A | | 11/1997 | Jagannatha et al. | 709/106 |
| 5,717,942 A | | 2/1998 | Haupt et al. | |
| 5,737,763 A | | 4/1998 | Hilditch | 711/162 |
| 5,752,067 A | * | 5/1998 | Wilkinson et al. | 712/16 |
| 5,754,871 A | * | 5/1998 | Wilkinson et al. | 712/20 |
| 5,761,523 A | * | 6/1998 | Wilkinson et al. | 712/20 |
| 5,765,011 A | * | 6/1998 | Wilkinson et al. | 712/20 |
| 5,765,154 A | | 6/1998 | Horikiri et al. | 707/10 |
| 5,784,702 A | | 7/1998 | Greenstein et al. | |
| 5,812,852 A | * | 9/1998 | Poulsen et al. | 395/706 |
| 5,819,020 A | | 10/1998 | Beeler, Jr. | 714/5 |
| 5,828,894 A | | 10/1998 | Wilkinson et al. | |
| 5,838,968 A | | 11/1998 | Culbert | 709/104 |
| 5,860,115 A | | 1/1999 | Neuhard et al. | |
| 5,884,018 A | | 3/1999 | Jardine et al. | |
| 5,898,870 A | * | 4/1999 | Okuda et al. | 709/104 |
| 5,923,890 A | * | 7/1999 | Kubala et al. | 712/1 |
| 5,931,938 A | | 8/1999 | Drogichen et al. | |
| 5,950,228 A | | 9/1999 | Scales et al. | |
| 5,956,522 A | | 9/1999 | Bertone et al. | |
| 5,974,493 A | * | 10/1999 | Okumura et al. | 710/127 |
| 5,987,506 A | * | 11/1999 | Carter et al. | 709/213 |
| 5,987,621 A | | 11/1999 | Duso et al. | |
| 6,002,851 A | | 12/1999 | Basavaiah et al. | |
| 6,012,151 A | | 1/2000 | Mano | |
| 6,021,508 A | | 2/2000 | Schmuck et al. | |
| 6,035,414 A | | 3/2000 | Okazawa et al. | |
| 6,041,377 A | | 3/2000 | Mayer et al. | 710/113 |
| 6,047,323 A | | 4/2000 | Krause | 709/227 |

OTHER PUBLICATIONS

European Search Report dated Jun. 26, 2000 (Application No. 98309011.9–2201–), 4 pages.

Ohmori et al., "System management of MICS–II—a virtual machine complex"; Third USA–Japan Computer Conference Proceedings, San Francisco, Calif., Sep. 1978, pp. 425–429.

Beck, "AAMP: A Multiprocessor Approach for Operating System and Application Migration," *Operating Systems Review* 24:41–55 (1990).

European Search Report dated Jun. 27, 2000 (Application No. 98309009.9–2201–).

Nanda et al., "Mapping Applications onto a Cache Coherent Multiprocessor," *Proceedings on Supercomputing '92*, pp. 368–377 (1992).

Rashid et al., "Machine–Independent Virtual Memory Management for Paged Uniprocessor and Multiprocessor Architectures," *IEEE Transactions on Computers* 37:896–907 (1988).

Cellular IRIX™ 6.4 Technical Report, *SiliconGraphics*, pp. 1–34 (Jan. 16, 1997).

G. Hoffnagle, Preface, IBM Systems Journal vol. 36 No. 2, S/390 Parallel Sysplex Cluster, p. 170, 1997.

J.M. Nick, et al., S/390 Cluster Technology: Parallel Sysplex, IBM Systems Journal vol. 36, No. 2, S/390 Parallel Sysplex Cluster, p. 172, 1997.

G.M. King, et al., Cluster Architectures and S/390 Parallel Sysplex Scalability, IBM Systems Journal vol. 36, No. 2, S/390 Parallel Sysplex Cluster, p. 221, 1997.

J. Aman, et al., Adaptive Algorithms for Managing a Distributed Data Processing Workload, IBM Systems Journal vol. 36, No. 2, S/390 Parallel Sysplex Cluster, p. 242, 1997.

N.S. Bowen, et al, Availability in Parallel Systems: Automatic Process Restart, IBM Systems Journal vol. 36, No. 2, S/390 Parallel Sysplex Cluster, p. 284, 1997.

D. Clitherow, et al., Parallel Sysplex Operational Scenarios, IBM Redbooks, 10/98.

IBM, S/390 VM/ESA Reference Guide, S/390 VM/ESA Reference Guide, 9/98.

IBM (website maintained by J.T. Watson Research Center), The Hypervisor, IBM Research, Jul. 12, 1996.

Sequent's NUMA–Q SMP Architecture, Sequent White Paper, 1997.

J. Chapin, et al., Hive: Fault Containment for Shared––Memory Multiprocessors, The 15th ACM Symposium on Operating Systems Principles, 12/95.

Hive, General Information on OS Homepage.

Rohit Chandra, et al., Scheduling and Page Migration for Multiprocessor Compute Servers, Sixth International Conference on Architectural Support for Programming Language and Operating Systems (ASPLOS–V1), 10/94.

M. Heinrich, et al., The Performance of Flexibility in the Stanford FLASH Multiprocessor, Proceedings of the ASPLOS–V1, 10/94.

Silicon Graphics, Cellular IRIX 6.4 Technical Report, Technical Report, 1996.

Sun Microsystems, Inc., Ultra Enterprise 10000: Dynamic System Domains, Technical White Paper, 1997.

Sun Microsystems, Inc., DR Configuration Issues, Dynamic Reconfiguration User's Guide, 1997.

A. Charlesworth, et al., Gigaplane–XB:Extending the Ultra Enterprise Family, Sun Microsystems, Inc., Jul. 30, 1997.

VAX/VMS Internals and Data Structures, Digital Equipment Corp., 4/81.

DEC, TruCluster: Digital's UNIX Cluster, Cluster White Paper, 1996.

DEC, Network Multiprocessing Comes of Age.

DEC, Symmetrical Multiprocessing, Technical Overview.

J.A. Hall, Engineering Excellence: DEC OSF/1 Symmetric Multiprocessing, DEC.

Sequent, Implementation and Performance of a CC–Numa System, Sequent White Paper.

C. Koppe, NUMA Architectures and User Level Scheduling a Short Introduction, May, 14, 1996.

C. Hanna, Logical Partitioning Methodologies, CMG (Conference), 1993.

D. Bartholomew, The NUMA Invasion, Industry Week, Jan. 6, 1997.

Sun Microsystems, Inc., Ultra Enterprise 10000 Server, Technical White Paper, 1997.

J.T. Turner, Specials, Skeleton Crew USA, Inc., Jan. 16, 1997.

B.F. Smith, DB2 and Business Intelligence in a S/390 Parallel Sysplex, DB2 and Business Intelligence in a S/390 Parallel Sysplex (Query Parallelism on DB2 Version 5), Nov. 11, 1997.

* cited by examiner

SOFTWARE PARTITIONED MULTI-PROCESSOR SYSTEM WITH FLEXIBLE RESOURCE SHARING LEVELS

FIELD OF THE INVENTION

This invention relates to multiprocessor computer architectures in which processors and other computer hardware resources are grouped in partitions, each of which has an operating system instance and, more specifically, to methods and apparatus for sharing resources in a variety of configurations between partitions.

BACKGROUND OF THE INVENTION

The efficient operation of many applications in present computing environments depend upon fast, powerful and flexible computing systems. The configuration and design of such systems has become very complicated when such systems are to be used in an "enterprise" commercial environment where there may be many separate departments, many different problem types and continually changing computing needs. Users in such environments generally want to be able to quickly and easily change the capacity of the system, its speed and its configuration. They may also want to expand the system work capacity and change configurations to achieve better utilization of resources without stopping execution of application programs on the system. In addition they may want to be able to configure the system in order to maximize resource availability so that each application will have an optimum computing configuration.

Traditionally, computing speed has been addressed by using a "shared nothing" computing architecture where data, business logic, and graphic user interfaces are distinct tiers and have specific computing resources dedicated to each tier. Initially, a single central processing unit was used and the power and speed of such a computing system was increased by increasing the clock rate of the single central processing unit. More recently, computing systems have been developed which use several processors working as a team instead one massive processor working alone. In this manner, a complex application can be distributed among many processors instead of waiting to be executed by a single processor. Such systems typically consist of several central processing units (CPUs) which are controlled by a single operating system. In a variant of a multiple processor system called "symmetric multiprocessing" or SMP, the applications are distributed equally across all processors. The processors also share memory. In another variant called "asymmetric multiprocessing" or AMP, one processor acts as a "master" and all of the other processors act as "slaves." Therefore, all operations, including the operating system, must pass through the master before being passed onto the slave processors. These multiprocessing architectures have the advantage that performance can be increased by adding additional processors, but suffer from the disadvantage that the software running on such systems must be carefully written to take advantage of the multiple processors and it is difficult to scale the software as the number of processors increases. Current commercial workloads do not scale well beyond 8–24 CPUs as a single SMP system, the exact number depending upon platform, operating system and application mix.

For increased performance, another typical answer has been to dedicate computer resources (machines) to an application in order to optimally tune the machine resources to the application. However, this approach has not been adopted by the majority of users because most sites have many applications and separate databases developed by different vendors. Therefore, it is difficult, and expensive, to dedicate resources among all of the applications especially in environments where the application mix is constantly changing. Further, with dedicated resources, it is essentially impossible to quickly and easily migrate resources from one computer system to another, especially if different vendors are involved. Even if such a migration can be performed, it typically involves the intervention of a system administrator and requires at least some of the computer systems to be powered down and rebooted.

Alternatively, a computing system can be partitioned with hardware to make a subset of the resources on a computer available to a specific application. This approach avoids dedicating the resources permanently since the partitions can be changed, but still leaves issues concerning performance improvements by means of load balancing of resources among partitions and resource availability.

The availability and maintainability issues were addressed by a "shared everything" model in which a large centralized robust server that contains most of the resources is networked with and services many small, uncomplicated client network computers. Alternatively, "clusters" are used in which each system or "node" has its own memory and is controlled by its own operating system. The systems interact by sharing disks and passing messages among themselves via some type of communication network. A cluster system has the advantage that additional systems can easily be added to a cluster. However, networks and clusters suffer from a lack of shared memory and from limited interconnect bandwidth which places limitations on performance.

In many enterprise computing environments, it is clear that the two separate computing models must be simultaneously accommodated and each model optimized. Further, it is highly desirable to be able to modify computer configurations "on the fly" without rebooting any of the systems. Several prior art approaches have been used to attempt this accommodation. For example, a design called a "virtual machine" or VM developed and marketed by International Business Machines Corporation, Armonk, N.Y., uses a single physical machine, with one or more physical processors, in combination with software which simulates multiple virtual machines. Each of those virtual machines has, in principle, access to all the physical resources of the underlying real computer. The assignment of resources to each virtual machine is controlled by a program called a "hypervisor". There is only one hypervisor in the system and it is responsible for all the physical resources. Consequently, the hypervisor, not the other operating systems, deals with the allocation of physical hardware. The hypervisor intercepts requests for resources from the other operating systems and deals with the requests in a globally-correct way.

The VM architecture supports the concept of a "logical partition" or LPAR. Each LPAR contains some of the available physical CPUs and resources which are logically assigned to the partition. The same resources can be assigned to more than one partition. LPARs are set up by an administrator statically, but can respond to changes in load dynamically, and without rebooting, in several ways. For example, if two logical partitions, each containing ten CPUs, are shared on a physical system containing ten physical CPUs, and, if the logical ten CPU partitions have complementary peak loads, each partition can take over the entire physical ten CPU system as the workload shifts without a re-boot or operator intervention.

In addition, the CPUs logically assigned to each partition can be turned "on" and "off" dynamically via normal operating system operator commands without re-boot. The only limitation is that the number of CPUs active at system initialization is the maximum number of CPUs that can be turned "on" in any partition.

Finally, in cases where the aggregate workload demand of all partitions is more than can be delivered by the physical system, LPAR "weights" can be used to define the portion of the total CPU resources which is given to each partition. These weights can be changed by system administrators, on-the-fly, with no disruption.

Another prior art system is called a "Parallel Sysplex" and is also marketed and developed by the International Business Machines Corporation. This architecture consists of a set of computers that are clustered via a hardware entity called a "coupling facility" attached to each CPU. The coupling facilities on each node are connected, via a fiber-optic link, and each node operates as a traditional SMP machine, with a maximum of 10 CPUs. Certain CPU instructions directly invoke the coupling facility. For example, a node registers a data structure with the coupling facility, then the coupling facility takes care of keeping the data structures coherent within the local memory of each node.

The Enterprise 10000 Unix server developed and marketed by Sun Microsystems, Mountain View, Calif., uses a partitioning arrangement called "Dynamic System Domains" to logically divide the resources of a single physical server into multiple partitions, or domains, each of which operates as a stand-alone server. Each of the partitions has CPUs, memory and I/O hardware. Dynamic reconfiguration allows a system administrator to create, resize, or delete domains "on the fly" and without rebooting. Every domain remains logically isolated from any other domain in the system, isolating it completely from any software error or CPU, memory, or I/O error generated by any other domain. There is no sharing of resources between any of the domains.

The Hive Project conducted at Stanford University uses an architecture which is structured as a set of cells. When the system boots, each cell is assigned a range of nodes, each having memory and I/O devices, that the cell owns throughout execution. Each cell manages the processors, memory and I/O devices on those nodes as if it were an independent operating system. The cells cooperate to present the illusion of a single system to user-level processes.

Hive cells are not responsible for deciding how to divide their resources between local and remote requests. Each cell is responsible only for maintaining its internal resources and for optimizing performance within the resources it has been allocated. Global resource allocation is carried out by a user-level process called "wax." The Hive system attempts to prevent data corruption by using certain fault containment boundaries between the cells. In order to implement the tight sharing expected from a multiprocessor system, despite the fault containment boundaries between cells, resource sharing is implemented through the cooperation of the various cell kernels, but the policy is implemented outside the kernels in the wax process. Both memory and processors can be shared.

A system called "Cellular IRIX" developed and marketed by Silicon Graphics Inc. Mountain View, Calif., supports modular computing by extending traditional symmetric multiprocessing systems. The Cellular IRIX architecture distributes global kernel text and data into optimized SMP-sized chunks or "cells". Cells represent a control domain consisting of one or more machine modules, where each module consists of processors, memory, and I/O. Applications running on these cells rely extensively on a full set of local operating system services, including local copies of operating system text and kernel data structures, bit only one instance of the operating system exists on the entire system. Inter-cell coordination allows application images to directly and transparently utilize processing, memory and I/O resources from other cells without incurring the overhead of data copies or extra context switches.

Another existing architecture called NUMA-Q developed and marketed by Sequent Computer Systems, Inc., Beaverton, Oregon uses "quads", or a group of four processors per portion of memory, as the basic building block for NUMA-Q SMP nodes. Adding I/O to each quad further improves performance. Therefore, the NUMA-Q architecture not only distributes physical memory but puts a predetermined number of processors and PCI slots next to each processor. The memory in each quad is not local memory in the traditional sense. Rather, it is a portion of the physical memory address space and has a specific address range. The address map is divided evenly over memory, with each quad containing a contiguous portion of address space. Only one copy of the operating system is running and, as in any SMP system, it resides in memory and runs processes without distinction and simultaneously on one or more processors.

Accordingly, while many attempts have been made at providing a flexible computer system having maximum resource availability and scalability, existing systems each have significant shortcomings. Therefore, it would be desirable to have a new computer system design which provides improved flexibility, resource availability and scalability. Specifically, it would be desirable to have a computer design which could accommodate each of the "shared nothing", "shared partial" and "shared everything" computing models and could be reconfigured to switch between the models without major service disruptions as different needs arise.

SUMMARY OF THE INVENTION

In accordance with the principles of the present invention, multiple instances of operating systems execute cooperatively in a single multiprocessor computer wherein all processors and resources are electrically connected together. The single physical machine with multiple physical processors and resources is subdivided by software into multiple partitions, each with the ability to run a distinct copy, or instance, of an operating system. Each of the partitions has access to its own physical resources plus resources designated as shared. In accordance with one embodiment, the partitioning is performed by assigning resources using a configuration data structure such as a configuration tree.

Since software logically partitions CPUs, memory, and I/O ports by assigning them to a partition, none, some, or all, resources may be designated as shared among multiple partitions. Each individual operating instance will generally be assigned the resources it needs to execute independently and these resources will be designated as "private." Other resources, particularly memory, can be assigned to more than one instance and shared. Shared memory is cache coherent so that instances may be tightly coupled, and may share resources that are normally allocated to a single instance such as distributed lock managers and cluster interconnects.

Newly-added resources, such as CPUs and memory, can be dynamically assigned to different partitions and used by instances of operating systems running within the machine by modifying the configuration.

BRIEF DESCRIPTION OF THE DRAWINGS

The above and further advantages of the invention may be better understood by referring to the following description in conjunction with the accompanying drawings and which.

DETAILED DESCRIPTION OF THE PREFERRED EMBODIMENT

A computer platform constructed in accordance with the principles of the present invention is a multi-processor system capable of being partitioned to allow the concurrent execution of multiple instances of operating system software. The system does not require hardware support for the partitioning of its memory, CPUs and I/O subsystems, but some hardware may be used to provide additional hardware assistance for isolating faults, and minimizing the cost of software engineering. The following specification describes the interfaces and data structures required to support the inventive software architecture. The interfaces and data structures described are not meant to imply a specific operating system must be used, or that only a single type of operating system will execute concurrently. Any operating system which implements the software requirements discussed below can participate in the inventive system operation.

System Building Blocks

Figure 1:
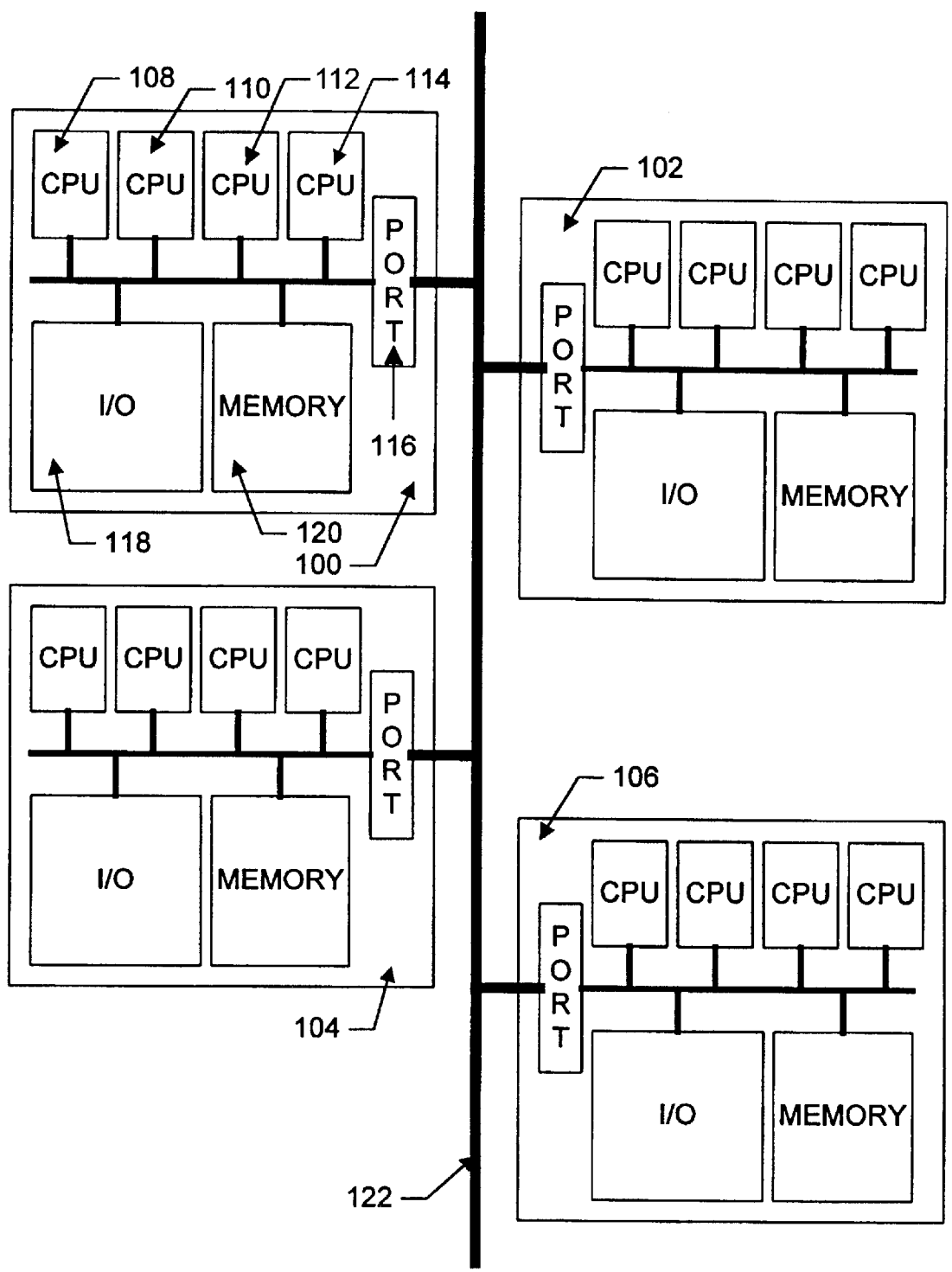
FIG. 1 is a schematic block diagram of a hardware platform illustrating several system building blocks.

The inventive software architecture operates on a hardware platform which incorporates multiple CPUs, memory and I/O hardware. Preferably, a modular architecture such as that shown in FIG. 1 is used, although those skilled in the art will understand that other architectures can also be used, which architectures need not be modular. FIG. 1 illustrates a computing system constructed of four basic system building blocks (SBBs) 100–106. In the illustrative embodiment, each building block, such as block 100, is identical and comprises several CPUs 108–114, several memory slots (illustrated collectively as memory 120), an I/O processor 118, and a port 116 which contains a switch (not shown) that can connect the system to another such system. However, in other embodiments, the building blocks need not be identical. Large multiprocessor systems can be constructed by connecting the desired number of system building blocks by means of their ports. Switch technology, rather than bus technology, is employed to connect building block components in order to both achieve the improved bandwidth and to allow for non-uniform memory architectures (NUMA).

In accordance with the principles of the invention, the hardware switches are arranged so that each CPU can address all available memory and I/O ports regardless of the number of building blocks configured as schematically illustrated by line 122. In addition, all CPUs may communicate to any or all other CPUs in all SBBs with conventional mechanisms, such as inter-processor interrupts. Consequently, the CPUs and other hardware resources can be associated solely with software. Such a platform architecture is inherently scalable so that large amounts of processing power, memory and I/O will be available in a single computer.

Figure 2:
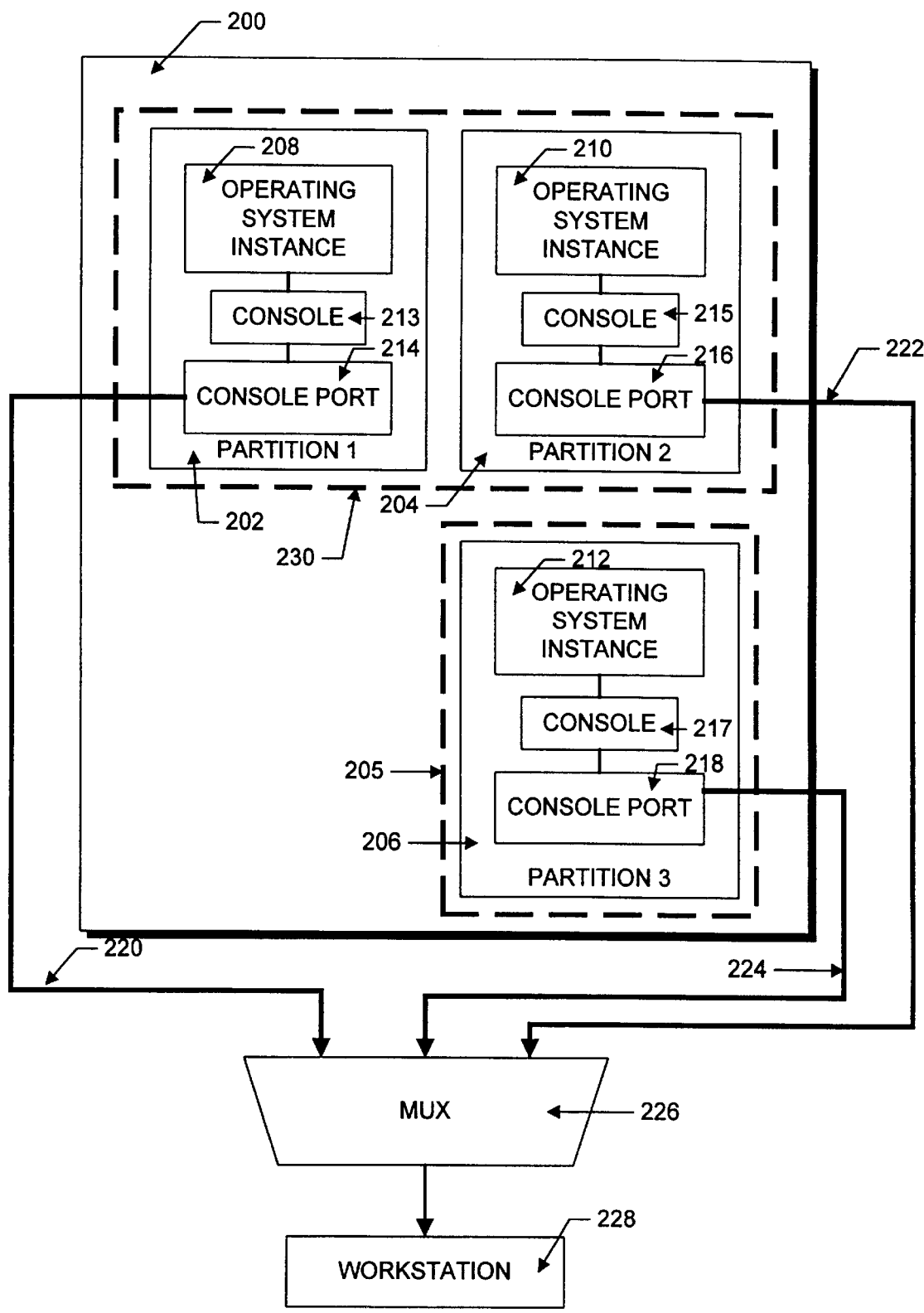
FIG. 2 is a schematic diagram of a computer system constructed in accordance with the principles of the present invention illustrating several partitions.

An APMP computer system 200 constructed in accordance with the principles of the present invention from a software view is illustrated in FIG. 2. In this system, the hardware components have been allocated to allow concurrent execution of multiple operating system instances 208, 210, 212.

In a preferred embodiment, this allocation is performed by a software program called a "console" program, which, as will hereinafter be described in detail, is loaded into memory at power up. Console programs are shown schematically in FIG. 2 as programs 213, 215 and 217. The console program may be a modification of an existing administrative program or a separate program which interacts with an operating system to control the operation of the preferred embodiment. The console program does not virtualize the system resources, that is, it does not create any software layers between the running operating systems 208, 210 and 212 and the physical hardware, such as memory and I/O units (not shown in FIG. 2.) Nor is the state of the running operating systems 208, 210 and 212 swapped to provide access to the same hardware. Instead, the inventive system logically divides the hardware into partitions. It is the responsibility of operating system instance 208, 210, and 212 to use the resources appropriately and provide coordination of resource allocation and sharing. The hardware platform may optionally provide hardware assistance for the division of resources, and may provide fault barriers to minimize the ability of an operating system to corrupt memory, or affect devices controlled by another operating system copy.

The execution environment for a single copy of an operating system, such as copy 208 is called a "partition" 202, and the executing operating system 208 in partition 202 is called "instance" 208. Each operating system instance is capable of booting and running independently of all other operating system instances in the computer system, and can cooperatively take part in sharing resources between operating system instances as described below.

In order to run an operating system instance, a partition must include a hardware restart parameter block (HWRPB), a copy of a console program, some amount of memory, one or more CPUs, and at least one I/O bus which must have a dedicated physical port for the console. The HWRPB is a configuration block which is passed between the console program and the operating system.

Each of console programs 213, 215 and 217, is connected to a console port, shown as ports 214, 216 and 218, respectively. Console ports, such as ports 214, 216 and 218, generally come in the form of a serial line port, or attached graphics, keyboard and mouse options. For the purposes of the inventive computer system, the capability of supporting a dedicated graphics port and associated input devices is not required, although a specific operating system may require it. The base assumption is that a serial port is sufficient for each partition. While a separate terminal, or independent graphics console, could be used to display information generated by each-console, preferably the serial lines 220, 222 and 224, can all be connected to a single multiplexer 226 attached to a workstation, PC, or LAT 228 for display of console information.

It is important to note that partitions are not synonymous with system building blocks. For example, partition 202 may comprise the hardware in building blocks 100 and 106 in FIG. 1 whereas partitions 204 and 206 might comprise the hardware in building blocks 102 and 104, respectively. Partitions may also include part of the hardware in a building block.

Partitions can be "initialized" or "uninitialized." An initialized partition has sufficient resources to execute an operating system instance, has a console program image loaded, and a primary CPU available and executing. An initialized partition may be under control of a console program, or may be executing an operating system instance. In an initialized state, a partition has full ownership and control of hardware components assigned to it and only the partition itself may release its components.

In accordance with the principles of the invention, resources can be reassigned from one initialized partition to another. Reassignment of resources can only be performed by the initialized partition to which the resource is currently assigned. When a partition is in an uninitialized state, other partitions may reassign its hardware components and may delete it.

An uninitialized partition is a partition which has no primary CPU executing either under control of a console program or an operating system. For example, a partition may be uninitialized due to a lack of sufficient resources at power up to run a primary CPU, or when a system administrator is reconfiguring the computer system. When in an uninitialized state, a partition may reassign its hardware components and may be deleted by another partition. Unassigned resources may be assigned by any partition.

Partitions may be organized into "communities" which provide the basis for grouping separate execution contexts to allow cooperative resource sharing. Partitions in the same community can share resources. Partitions that are not within the same community cannot share resources. Resources may only be manually moved between partitions that are not in the same community by the system administrator by de-assigning the resource (and stopping usage), and manually reconfiguring the resource. Communities can be used to create independent operating system domains, or to implement user policy for hardware usage. In FIG. 2, partitions 202 and 204 have been organized into community 230. Partition 206 may be in its own community 205. Communities can be constructed using the configuration tree described below and may be enforced by hardware.

The Console Program

When a computer system constructed in accordance with the principles of the present invention is enabled on a platform, multiple HWRPB's must be created, multiple console program copies must be loaded, and system resources must be assigned in such a way that each HWRPB is associated with specific components of the system. To do this, the first console program to run will create a configuration tree structure in memory which represents all of the hardware in the system. The tree will also contain the software partitioning information, and the assignments of hardware to partitions and is discussed in detail below.

More specifically, when the APMP system is powered up, a CPU will be selected as a primary CPU in a conventional manner by hardware which is specific to the platform on which the system is running. The primary CPU then loads a copy of a console program into memory. This console copy is called a "master console" program. The primary CPU initially operates under control of the master console program to perform testing and checking assuming that there is a single system which owns the entire machine. Subsequently, a set of environment variables are loaded which define the system partitions. Finally, the master console creates and initializes the partitions based on the environment variables. In this latter process the master console operates to create the configuration tree, to create additional HWRPB data blocks, to load the additional console program copies, and to start the CPUs on the alternate HWRPBs. Each partition then has an operating system instance running on it, which instance cooperates with a console program copy also running in that partition. In an unconfigured APMP system, the master console program will initially create a single partition containing the primary CPU, a minimum amount of memory, and a physical system administrator's console selected in a platform-specific way. Console program commands will then allow the system administrator to create additional partitions, and configure I/O buses, memory, and CPUs for each partition.

After associations of resources to partitions have been made by the console program, the associations are stored in non-volatile RAM to allow for an automatic configuration of the system during subsequent boots. During subsequent boots, the master console program must validate the current configuration with the stored configuration to handle the removal and addition of new components. Newly-added components are placed into an unassigned state, until they are assigned by the system administrator. If the removal of a hardware component results in a partition with insufficient resources to run an operating system, resources will continue to be assigned to the partition, but it will be incapable of running an operating system instance until additional new resources are allocated to it.

As previously mentioned, the console program communicates with an operating system instance by means of an HWRPB which is passed to the operating system during operating system boot up. The fundamental requirements for a console program are that it should be able to create multiple copies of HWRPBs and itself. Each HWRPB copy created by the console program will be capable of booting an independent operating system instance into a private section of memory and each operating system instance booted in this manner can be identified by a unique value placed into the HWRPB. The value indicates the partition, and is also used as the operating system instance ID.

In addition, the console program is configured to provide a mechanism to remove a CPU from the available CPUs within a partition in response to a request by an operating system running in that partition. Each operating system instance must be able to shutdown, halt, or otherwise crash in a manner that control is passed to the console program. Conversely, each operating system instance must be able to reboot into an operational mode, independently of any other operating system instance.

Each HWRPB which is created by a console program will contain a CPU slot-specific database for each CPU that is in the system, or that can be added to the system without powering the entire system down. Each CPU that is physically present will be marked "present", but only CPUs that will initially execute in a specific partition will be marked "available" in the HWRPB for the partition. The operating system instance running on a partition will be capable of recognizing that a CPU may be available at some future time by a present (PP) bit in a per-CPU state flag fields of the HWRPB, and can build data structures to reflect this. When set, the available (PA) bit in the per-CPU state flag fields indicates that the associated CPU is currently associated with the partition, and can be invited to join SMP operation.

The Configuration Tree

As previously mentioned, the master console program creates a configuration tree which represents the hardware configuration, and the assignment of each component in the system to each partition. Each console program then identifies the configuration tree to its associated operating system instance by placing a pointer to the tree in the HWRPB.

Figure 3:
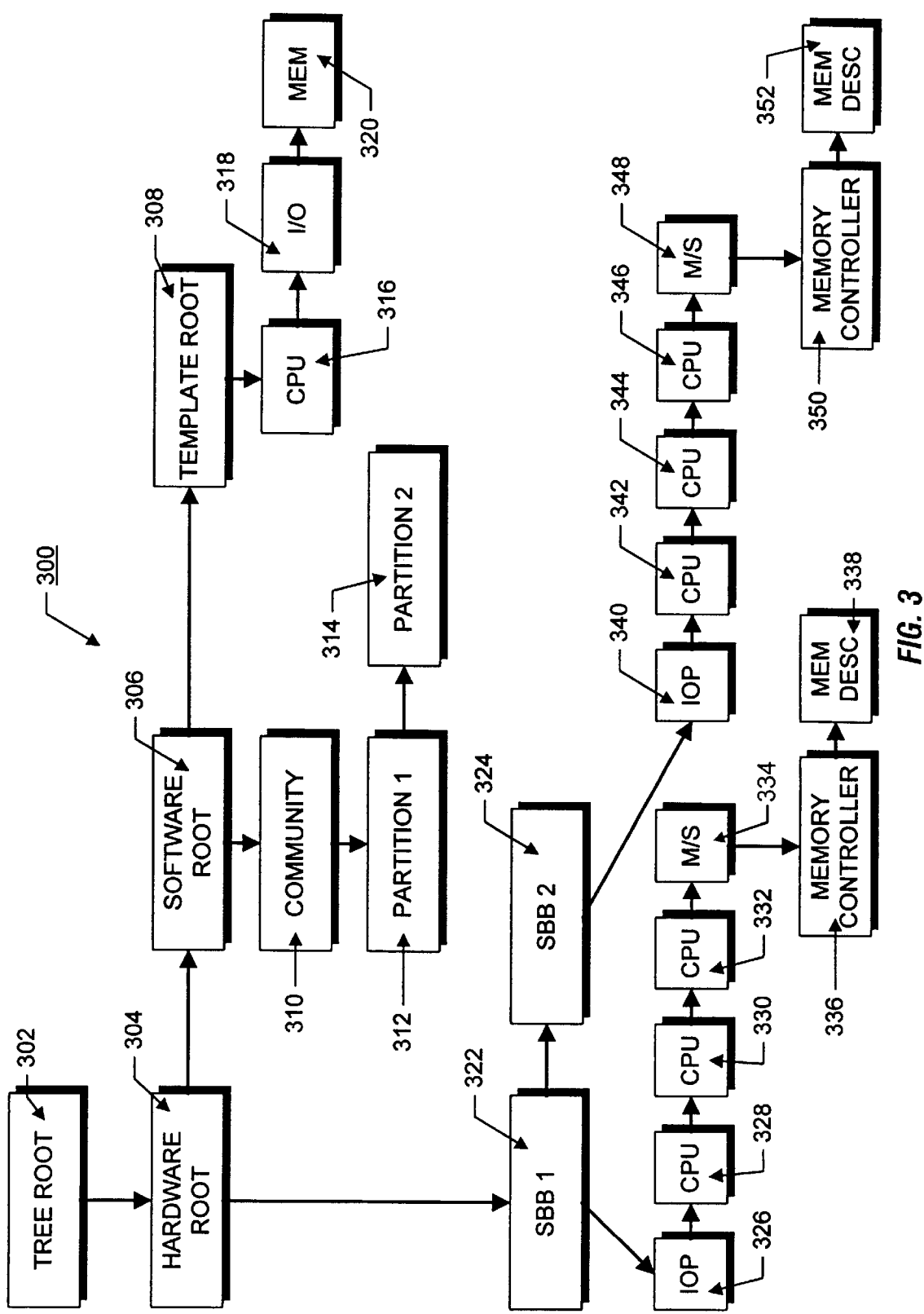
FIG. 3 is a schematic diagram of a configuration tree illustrating child and sibling pointers.

Referring to FIG. 3, the configuration tree 300 represents the hardware components in the system, the platform constraints and minimums, and the software configuration. The master console program builds the tree using information discovered by probing the hardware, and from information stored in non-volatile RAM which contains configuration information generated during previous initializations.

The master console may generate a single copy of the tree which copy is shared by all operating system instances, or it may replicate the tree for each instance. A single copy of the tree has the disadvantage that it can create a single point of failure in systems with independent memories. However, platforms that generate multiple tree copies require the console programs to be capable of keeping changes to the tree synchronized.

The configuration tree comprises multiple nodes including root nodes, child nodes and sibling nodes. Each node is formed of a fixed header and a variable length extension for overlaid data structures. The tree starts with a tree root node 302 representing the entire system box, followed by branches that describe the hardware configuration (hardware root node 304), the software configuration (software root node 306), and the minimum partition requirements (template root node 308.) In FIG. 3, the arrows represent child and sibling relationships. The children of a node represent component parts of the hardware or software configuration. Siblings represent peers of a component that may not be related except by having the same parent. Nodes in the tree 300 contain information on the software communities and operating system instances, hardware configuration, configuration constraints, performance boundaries and hot-swap capabilities. The nodes also provide the relationship of hardware to software ownership, or the sharing of a hardware component.

The nodes are stored contiguously in memory and the address offset from the tree root node 302 of the tree 300 to a specific node forms a "handle" which may be used from any operating system instance to unambiguously identify the same component on any operating system instance. In addition, each component in the inventive computer system has a separate ID. This may illustratively be a 64-bit unsigned value. The ID must specify a unique component when combined with the type and subtype values of the component. That is, for a given type of component, the ID must identify a specific component. The ID may be a simple number, for example the CPU ID, it may be some other unique encoding, or a physical address. The component ID and handle allow any member of the computer system to identify a specific piece of hardware or software. That is, any partition using either method of specification must be able to use the same specification, and obtain the same result.

As described above, the inventive computer system is composed of one or more communities which, in turn, are composed of one or more partitions. By dividing the partitions across the independent communities, the inventive computer system can be placed into a configuration in which sharing of devices and memory can be limited. Communities and partitions will have IDs which are densely packed. The hardware platform will determine the maximum number of partitions based on the hardware that is present in the system, as well as having a platform maximum limit. Partition and community IDs will never exceed this value during runtime. IDs will be reused for deleted partitions and communities. The maximum number of communities is the same as the maximum number of partitions. In addition, each operating system instance is identified by a unique instance identifier, for example a combination of the partition ID plus an incarnation number.

The communities and partitions are represented by a software root node 306, which has community node children (of which community node 310 is shown), and partition node grandchildren (of which two nodes, 312 and 314, are shown.)

Figure 4:
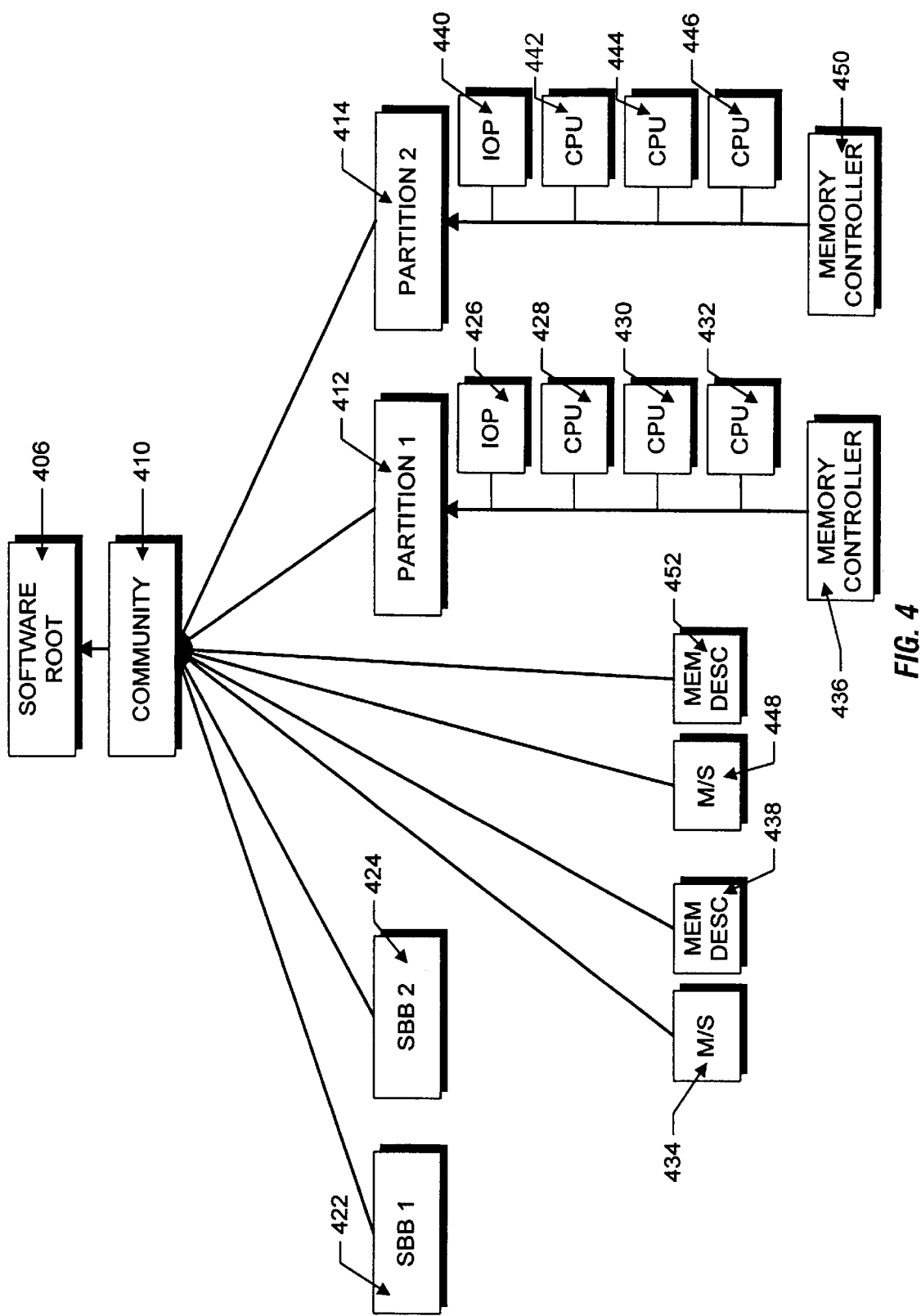
FIG. 4 is a schematic diagram of the configuration tree shown in FIG. 3 and rearranged to illustrate ownership pointers.

The hardware components are represented by a hardware root node 304 which contains children that represent a hierarchical representation of all of the hardware currently present in the computer system. "Ownership" of a hardware component is represented by a handle in the associated hardware node which points to the appropriate software node (310, 312 or 314.) These handles are illustrated in FIG. 4 which will be discussed in more detail below. Components that are owned by a specific partition will have handles that point to the node representing the partition. Hardware which is shared by multiple partitions (for example, memory) will have handles that point to the community to which sharing is confined. Un-owned hardware will have a handle of zero (representing the tree root node 302).

Hardware components place configuration constraints on how ownership may be divided. A "config" handle in the configuration tree node associated with each component determines if the component is free to be associated anywhere in the computer system by pointing to the hardware root node 304. However, some hardware components may be bound to an ancestor node and must be configured as part of this node. Examples of this are CPUs, which may have no constraints on where they execute, but which are a component part of a system building block (SBB), such as SBBs 322 or 324. In this case, even though the CPU is a child of the SBB, its config handle will point to the hardware root node 304. An I/O bus, however, may not be able to be owned by a partition other than the partition that owns its I/O processor. In this case, the configuration tree node representing the I/O bus would have a config handle pointing to the I/O processor. Because the rules governing hardware configuration are platform specific, this information is provided to the operating system instances by the config handle.

Each hardware component also has an "affinity" handle. The affinity handle is identical to the config handle, except that it represents a configuration which will obtain the best performance of the component. For example, a CPU or memory may have a config handle which allows it to be configured anywhere in the computer system (it points to the hardware root node 304), however, for optimal performance, the CPU or memory should be configured to use the System Building Block of which they are a part. The result is that the config pointer points to the hardware root node 304, but the affinity pointer points to an SBB node such as node 322 or node 324. The affinity of any component is platform specific, and determined by the firmware. Firmware may use this information when asked to form "optimal" automatic configurations.

Each node also contains several flags which indicate the type and state of the node. These flags include a node_hotswap flag which indicates that the component represented is a "hot swappable" component and can be powered down independently of its parent and siblings. However, all children of this node must power down if this component powers down. If the children can power down independently of this component, they must also have this bit set in their corresponding nodes. Another flag is a node_unavailable flag which, when set, indicates that the component represented by the node is not currently available for use. When a component is powered down (or is never powered up) it is flagged as unavailable.

Two flags, node_hardware and node_template, indicate the type of node. Further flags, such as node_initialized and node_cpu_primary may also be provided to indicate whether the node represents a partition which has been initialized or a CPU that is currently a primary CPU.

The configuration tree 300 may extend to the level of device controllers, which will allow the operating system to build bus and device configuration tables without probing the buses. However, the tree may also end at any level, if all components below it cannot be configured independently. System software will still be required to probe for bus and device information not provided by the tree.

The console program implements and enforces configuration constraints, if any, on each component of the system. In general, components are either assignable without constraints (for example, CPUs may have no constraints), or are configurable only as a part of another component (a device adapter, for example, may be configurable only as a part of its bus). A partition which is, as explained above, a grouping of CPUs, memory, and I/O devices into a unique software entity also has minimum requirements. For example, the minimum hardware requirements for a partition are at least one CPU, some private memory (platform dependent minimum, including console memory) and an I/O bus, including a physical, non-shared, console port.

The minimal component requirements for a partition are provided by the information contained in the template root node 308. The template root node 308 contains nodes, 316, 318 and 320, representing the hardware components that must be provided to create a partition capable of execution of a console program and an operating system instance. Configuration editors can use this information as the basis to determine what types, and how many resources must be available to form a new partition.

During the construction of a new partition, the template subtree will be "walked", and, for each node in the template subtree, there must be a node with the same type and subtype owned by the new partition so that it will be capable of loading a console program and booting an operating system instance. If there are more than one node of the same type and subtype in the template tree, there must also be multiple nodes in the new partition. The console program will use the template to validate that a new partition has the minimum requirements prior to attempting to load a console program and initialize operation.

The following is a detailed example of a particular implementation of configuration tree nodes. It is intended for descriptive purposes only and is not intended to be limiting. Each HWRPB must point to a configuration tree which provides the current configuration, and the assignments of components to partitions. A configuration pointer (in the CONFIG field) in the HWRPB is used to point to the configuration tree. The CONFIG field points to a 64-byte header containing the size of the memory pool for the tree, and the initial checksum of the memory. Immediately following the header is the root node of the tree. The header and root node of the tree will be page aligned.

The total size in bytes of the memory allocated for the configuration tree is located in the first quadword of the header. The size is guaranteed to be in multiples of the hardware page size. The second quadword of the header is reserved for a checksum. In order to examine the configuration tree, an operating system instance maps the tree into its local address space. Because an operating system instance may map this memory with read access allowed for all applications, some provision must be made to prevent a non-privileged application from gaining access to console data to which it should not have access. Access may be restricted by appropriately allocating memory. For example, the memory may be page aligned and allocated in whole pages. Normally, an operating system instance will map the first page of the configuration tree, obtain the tree size, and then remap the memory allocated for configuration tree usage. The total size may include additional memory used by the console for dynamic changes to the tree.

Preferably, configuration tree nodes are formed with fixed headers, and may optionally contain type-specific information following the fixed portion. The size field contains the full length of the node, nodes are illustratively allocated in multiples of 64-bytes and padded as needed. The following description defines illustrative fields in the fixed header for a node:

```
typedef struct_gct_node {
        unsigned char      type;
        unsigned char      subtype;
        uint16             size;
        GCT_HANDLE         owner;
        GCT_HANDLE         current_owner;
        GCT_ID             id;
        union {
           uint64          node_flags;
           struct {
              unsigned     node_hardware      : 1;
              unsigned     node hotswap       : 1;
              unsigned     node_unavailable   : 1;
              unsigned     node_hw_template   : 1;
              unsigned     node_initialized   : 1;
              unsigned     node_cpu_primary   : 1;
        #define NODE_HARDWARE       0x001
        #define NODE_HOTSWAP        0x002
        #define NODE_UNAVAILABLE    0x004
        #define NODE_HW_TEMPLATE    0x008
        #define NODE_INITIALIZED    0x010
```

-continued

```
        #define NODE_PRIMARY      0x020
        } flag_bits;
    } flag_union;
    GCT_HANDLE   config;
    GCT_HANDLE   affinity;
    GCT_HANDLE   parent;
    GCT_HANDLE   next_sib;
    GCT_HANDLE   prev_sib;
    GCT_HANDLE   child;
    GCT_HANDLE   reserved;
    uint32       magic
} GCT_NODE;
```

In the above definition the type definitions "uint" are unsigned integers with the appropriate bit lengths. As previously mentioned, nodes are located and identified by a handle (identified by the typedef GCT_HANDLE in the definition above). An illustrative handle is a signed 32-bit offset from the base of the configuration tree to the node. The value is unique across all partitions in the computer system. That is, a handle obtained on one partition must be valid to lookup a node, or as an input to a console callback, on all partitions. The magic field contains a predetermined bit pattern which indicates that the node is actually a valid node.

The tree root node represents the entire system. Its handle is always zero. That is, it is always located at the first physical location in the memory allocated for the configuration tree following the config header. It has the following definition

```
typedef struct_gct_root_node {
    GCT_NODE     hd;
    uint64       lock;
    uint64       transient_level;
    uint64       current_level;
    uint64       console_req;
    uint64       min_alloc;
    uint64       min_align;
    uint64       base_alloc;
    uint64       base_align;
    uint64       max_phys_address;
    uint64       mem_size;
    uint64       platform_type;
    int32        platform_name;
    GCT_HANDLE   primary_instance;
    GCT_HANDLE   first_free;
    GCT_HANDLE   high_limit;
    GCT_HANDLE   lookaside;
    GCT_HANDLE   available;
    uint32       max_partition;
    int32        partitions;
    int32        communities;
    uint32       max_platform_partition;
    uint32       max_fragments;
    uint32       max_desc;
    char         APMP_id[16];
    char         APMP_id_pad[4];
    int32        bindings;
}   GCT_ROOT_NODE;
```

The fields in the root node are defined as follows:

lock
  This field is used as a simple lock by software wishing to inhibit changes to the structure of the tree, and the software configuration. When this value is −1 (all bits on) the tree is unlocked; when the value is >=0 the tree is locked. This field is modified using atomic operations. The caller of the lock routine passes a partition ID which is written to the lock field. This can be used to assist in fault tracing, and recovery during crashes.

transient_level
  This field is incremented at the start of a tree update.
current_level
  This field is updated at the completion of a tree update.
console_req
  This field specifies the memory required in bytes for the console in the base memory segment of a partition.
min_alloc
  This field holds the minimum size of a memory fragment, and the allocation unit (fragments size must be a multiple of the allocation). It must be a power of 2.
min_align
  This field holds the alignment requirements for a memory fragment. It must be a power of 2.
base_alloc
  This field specifies the minimum memory in bytes (including console_req) needed for the base memory segment for a partition. This is where the console, console structures, and operating system will be loaded for a partition. It must be greater or equal to minAlloc and a multiple of minAlloc.
base_align
  This field holds the alignment requirement for the base memory segment of a partition. It must be a power of 2, and have an alignment of at least min_alig005 n.
max_phys_address
  The field holds the calculated largest physical address that could exist on the system, including memory subsystems that are not currently powered on and available.
mem_size
  This field holds the total memory currently in system.
platform_type
  This field stores the type of platform taken from a field in the HWRPB.
platform_name
  This field holds an integer offset from the base of the tree root node to a string representing the name of the platform.
primary_instance
  This field stores the partition ID of the first operating system instance.
first_free
  This field holds the offset from the tree root node to the first free byte of memory pool used for new nodes.
high_limit
  This field holds the highest address at which a valid node can be located within the configuration tree. It is used by callbacks to validate that a handle is legal.
lookaside
  This field is the handle of a linked list of nodes that have been deleted, and that may be reclaimed. When a community or partition are deleted, the node is linked into this list, and creation of a new partition or community will look at this list before allocating from free pool.
available
  This field holds the number of bytes remaining in the free pool pointed to by the first_free field.
max_partitions
  This field holds the maximum number of partitions computed by the platform based on the amount of hardware resources currently available.
partitions This field holds an offset from the base of the root node to an array of handles.

Each partition ID is used as an index into this array, and the partition node handle is stored at the indexed location. When a new partition is created, this array is examined to find the first partition ID which does not have a corresponding partition node handle and this partition ID is used as the ID for the new partition.

communities

This field also holds an offset from the base of the root node to an array of handles. Each community ID is used an index into this array, and a community node handle is stored in the array. When a new community is created, this array is examined to find the first community ID which does not have a corresponding community node handle and this community ID is used as the ID for the new community. There cannot be more communities than partitions, so the array is sized based on the maximum number of partitions.

max_platform_partition

This field holds the maximum number of partitions that can simultaneously exist on the platform, even if additional hardware is added (potentially inswapped).

max_fragments

This field holds a platform defined maximum number of fragments into which a memory descriptor can be divided. It is used to size the array of fragments in the memory descriptor node.

max_desc

This field holds the maximum number of memory descriptors for the platform.

APMP_id

This field holds a system ID set by system software and saved in non-volatile RAM.

APMP_id_pad

This field holds padding bytes for the APMP ID.

bindings

This field holds an offset to an array of "bindings" Each binding entry describes a type of hardware node, the type of node the parent must be, the configuration binding, and the affinity binding for a node type. Bindings are used by software to determine how node types are related and configuration and affinity rules.

A community provides the basis for the sharing of resources between partitions. While a hardware component may be assigned to any partition in a community, the actual sharing of a device, such as memory, occurs only within a community. The community node 310 contains a pointer to a control section, called an APMP database, which allows the operating system instances to control access and membership in the community for the purpose of sharing memory and communications between instances. The APMP database and the creation of communities are discussed in detail below. The configuration ID for the community is a signed 16-bit integer value assigned by the console program. The ID value will never be greater than the maximum number of partitions that can be created on the platform.

A partition node, such as node 312 or 314, represents a collection of hardware that is capable of running an independent copy of the console program, and an independent copy of an operating system. The configuration ID for this node is a signed 16-bit integer value assigned by the console. The ID will never be greater than the maximum number of partitions that can be created on the platform. The node has the definition:

```
typedef struct_gct_partition_node {
    GCT_NODE    hd;
    uint64      hwrpb;
    uint64      incarnation;
    uint64      priority;
    int32       os_type;
    uint32      partition_reserved_1;
    uint64      instance_name_format;
    char        instance_name[128];
} GCT_PARTITION_NODE;
```

The defined fields have the definitions:

hwrpb

This field holds the physical address of the hardware restart parameter block for this partition. To minimize changes to the HWRPB, the HWRPB does not contain a pointer to the partition, or the partition ID. Instead, the partition nodes contain a pointer to the HWRPB. System software can then determine the partition ID of the partition in which it is running by searching the partition nodes for the partition which contains the physical address of its HWRPB.

incarnation

This field holds a value which is incremented each time the primary CPU of the partition executes a boot or restart operation on the partition.

priority

This field holds a partition priority.

os_type

This field holds a value which indicates the type of operating system that will be loaded in the partition.

partition_reserved_1

This field is reserved for future use.

instance_name_format

This field holds a value that describes the format of the instance name string.

instance_name

This field holds a formatted string which is interpreted using the instance_name_format field. The value in this field provides a high-level path name to the operating system instance executing in the partition. This field is loaded by system software and is not saved across power cycles. The field is cleared at power up and at partition creation and deletion.

A System Building Block node, such as node 322 or 324, represents an arbitrary piece of hardware, or conceptual grouping used by system platforms with modular designs such as that illustrated in FIG. 2. A QBB (Quad Building Block) is a specific example of an SBB and corresponds to units such as units 100, 102, 104 and 106 in FIG. 1. Children of the SBB nodes 322 and 324 include input/output processor nodes 326 and 340.

CPU nodes, such as nodes 328–332 and 342–346, are assumed to be capable of operation as a primary CPU for SMP operation. In the rare case where a CPU is not primary capable, it will have a SUBTYPE code indicating that it cannot be used as a primary CPU in SMP operation. This information is critical when configuring resources to create a new partition. The CPU node will also carry information on where the CPU is currently executing. The primary for a partition will have the NODE_CPU_PRIMARY flag set in the NODE_FLAGS field. The CPU node has the following definition:

```
typedef struct_gct_cpu_node {
        GCT_NODE    hd;
} GCT_CPU_NODE;
```

A memory subsystem node, such as node 334 or 348, is a "pseudo" node that groups together nodes representing the physical memory controllers and the assignments of the memory that the controllers provide. The children of this node consist of one or more memory controller nodes (such as nodes 336 and 350) which the console has configured to operate together (interleaved), and one or more memory descriptor nodes (such as nodes 338 and 352) which describe physically contiguous ranges of memory.

A memory controller node (such as nodes 336 or 350) is used to express a physical hardware component, and its owner is typically the partition which will handle errors, and initialization. Memory controllers cannot be assigned to communities, as they require a specific operating system instance for initialization, testing and errors. However, a memory description, defined by a memory descriptor node, may be split into "fragments" to allow different partitions or communities to own specific memory ranges within the memory descriptor. Memory is unlike other hardware resources in that it may be shared concurrently, or broken into "private" areas. Each memory descriptor node contains a list of subset ranges that allow the memory to be divided among partitions, as well as shared between partitions (owned by a community). A memory descriptor node (such as nodes 338 or 352) is defined as:

```
typedef struct_gct_mem_desc_node {
        GCT_NODE        hd;
        GCT_MEM_INFO    mem_info;
        int32           mem_frag;
}GCT_MEM_DESC_NODE;
```

The mem_info structure has the following definition:

```
typedef struct_gct_mem_info {
        uint64    base_pa;
        uint64    base_size;
        uint32    desc_count;
        uint32    info_fill;
}GCT_MEM_INFO:
```

The mem_frag field holds an offset from the base of the memory descriptor node to an array of GCT_MEM_DESC structures which have the definition:.

```
typedef struct_gct_mem_desc {
        uint64           pa;
        unit64           size;
        GCT_HANDLE       mem_owner;
        GCT_HANDLE       mem_current_owner;
        union {
            uint32       mem_flags;
            struct {
                unsigned mem_console     : 1;
                unsigned mem_private     : 1;
                unsigned mem_shared      : 1;
                unsigned base            : 1;
            #define CGT_MEM_CONSOLE    0x1
            #define CGT_MEM_PRIVATE    0x2
            #define CGT_MEM_SHARED     0x4
            #define CGT_MEM_CONSOLE    0x8
            } flag_bits;
        } flag_union;
        uint32           mem_fill;
} GCT_MEM_DESC;
```

The number of fragments in a memory description node (nodes 338 or 352) is limited by platform firmware. This creates an upper bound on memory division, and limits unbounded growth of the configuration tree. Software can determine the maximum number of fragments from the max_fragments field in the tree root node 302 (discussed above), or by calling an appropriate console callback function to return the value. Each fragment can be assigned to any partition, provided that the config binding, and the ownership of the memory descriptor and memory subsystem nodes allow it. Each fragment contains a base physical address, size, and owner field, as well as flags indicating the type of usage.

To allow shared memory access, the memory subsystem parent node, and the memory descriptor node must be owned by a community. The fragments within the memory descriptor may then be owned by the community (shared) or by any partition within the community.

Fragments can have minimum allocation sizes and alignments provided in the tree root node 302. The base memory for a partition (the fragments where the console and operating system will be loaded) may have a greater allocation and alignment than other fragments (see the tree root node definition above). If the owner field of the memory descriptor node is a partition, then the fragments can only be owned by that partition.

FIG. 4 illustrates the configuration tree shown in FIG. 3 when it is viewed from a perspective of ownership. The console program for a partition relinquishes ownership and control of the partition resources to the operating system instance running in that partition when the primary CPU for that partition starts execution. The concept of "ownership" determines how the hardware resources and CPUs are assigned to software partitions and communities. The configuration tree has ownership pointers illustrated in FIG. 4 which determine the mapping of hardware devices to software such as partitions (exclusive access) and communities (shared access). An operating system instance uses the information in the configuration tree to determine to which hardware resources it has access and reconfiguration control.

Passive hardware resources which have no owner are unavailable for use until ownership is established. Once ownership is established by altering the configuration tree, the operating system instances may begin using the resources. When an instance makes an initial request, ownership can be changed by causing the owning operating system to stop using a resource or by a console program taking action to stop using a resource in a partition where no operating system instance is executing. The configuration tree is then altered to transfer ownership of the resource to another operating system instance. The action required to cause an operating system to stop using a hardware resource is operating system specific, and may require a reboot of the operating system instances affected by the change.

To manage the transition of a resource from an owned and active state, to a unowned and inactive state, two fields are provided in each node of the tree. The owner field represents the owner of a resource and is loaded with the handle of the owning software partition or community. At power up of an APMP system, the owner fields of the hardware nodes are loaded from the contents of non-volatile RAM to establish an initial configuration.

To change the owner of a resource, the handle value is modified in the owner field of the hardware component, and in the owner fields of any descendants of the hardware component which are bound to the component by their config handles. The current_owner field represents the current user of the resource. When the owner and current_owner fields hold the same non-zero value, the resource is owned and active. Only the owner of a resource can de-assign the resource (set the owner field to zero). A resource that has null owner and current_owner fields is unowned, and inactive. Only resources which have null owner and current_owner fields may be assigned to a new partition or community.

When a resource is de-assigned, the owner may decide to de-assign the owner field, or both the owner and current_owner fields. The decision is based on the ability of the owning operating system instance running in the partition to discontinue the use of the resource prior to de-assigning ownership. In the case where a reboot is required to relinquish ownership, the owner field is cleared, but the current_owner field is not changed. When the owning operating system instance reboots, the console program can clear any current_owner fields for resources that have no owner during initialization.

During initialization, the console program will modify the current_owner field to match the owner field for any node of which it is the owner, and for which the current_owner field is null. System software should only use hardware of which it is the current owner. In the case of a de-assignment of a resource which is owned by a community, it is the responsibility of system software to manage the transition between states. In some embodiments, a resource may be loaned to another partition. In this condition, the owner and current_owner fields are both valid, but not equal. The following table summarizes the possible resource states and the values of the owner and current_owner fields:

TABLE 1

| owner field value | current_owner field value | Resource State |
| --- | --- | --- |
| none | none | unowned, and inactive |
| none | valid | unowned, but still active |
| valid | none | owned, not yet active |
| valid | equal to owner | owned and active |
| valid | is not equal to owner | loaned |

Because CPUs are active devices, and sharing of CPUs means that a CPU could be executing in the context of a partition which may not be its "owner", ownership of a CPU is different from ownership of a passive resource. The CPU node in the configuration tree provides two fields that indicate which partition a CPU is nominally "owned" by, and in which partition the CPU is currently executing. The owner field contains a value which indicates the nominal ownership of the CPU, or more specifically, the partition in which the CPU will initially execute at system power up.

Until an initial ownership is established (that is, if the owner field is unassigned), CPUs are placed into a HWRPB context decided by the master console, but the HWRPB available bit for the CPU will not be set in any HWRPB. This combination prevents the CPU from joining any operating system instance in SMP operation. When ownership of a CPU is established (the owner field is filled in with a valid partition handle), the CPU will migrate, if necessary, to the owning partition, set the available bit in the HWRPB associated with that partition, and request to join SMP operation of the instance running in that partition, or join the console program in SMP mode. The combination of the present and available bits in the HWRPB tell the operating system instance that the CPU is available for use in SMP operation, and the operating system instance may use these bits to build appropriate per-CPU data structures, and to send a message to the CPU to request it to join SMP operation.

When a CPU sets the available bit in an HWRPB, it also enters a value into the current_owner field in its corresponding CPU node in the configuration tree. The current_owner field value is the handle of the partition in which the CPU has set the active HWRPB bit and is capable of joining SMP operation. The current_owner field for a CPU is only set by the console program. When a CPU migrates from one partition to another partition, or is halted into an unassigned state, the current_owner field is cleared (or changed to the new partition handle value) at the same time that the available bit is cleared in the HWRPB. The current_owner field should not be written to directly by system software, and only reflects which HWRPB has the available bit set for the CPU.

During runtime, an operating system instance can temporarily "loan" a CPU to another partition without changing the nominal ownership of the CPU. The traditional SMP concept of ownership using the HWRPB present and available bits is used to reflect the current execution context of the CPU by modifying the HWRPB and the configuration tree in atomic operations. The current_owner field can further be used by system software in one of the partitions to determine in which partition the CPU is currently executing (other instances can determine the location of a particular CPU by examining the configuration tree.)

It is also possible to de-assign a CPU and return it into a state in which the available bit is not set in any HWRPB, and the current_owner field in the configuration tree node for the CPU is cleared. This is accomplished by halting the execution of the CPU and causing the console program to clear the owner field in the configuration tree node, as well as the current_owner field and the available HWRPB bit. The CPU will then execute in console mode and poll the owner field waiting for a valid partition handle to be written to it. System software can then establish a new owner, and the CPU begin execution in the new partition.

Illustrative ownership pointers are illustrated in FIG. 4 by arrows. Each of the nodes in FIG. 4 that corresponds to a similar node in FIG. 3 is given a corresponding number. For example, the software root node denoted in FIG. 3 as node 306 is denoted as node 406 in FIG. 4. As shown in FIG. 4, the community 410 is "owned" by the software root 406. Likewise, the system building blocks 1 and 2 (422 and 425) are owned by the community 410. Similarly, partitions 412 and 414 are also owned by the community 410.

Partition 412 owns CPUs 428–432 and the I/O processor 426. The memory controller 436 is also a part of partition 1 (412). In a like manner, partition 2 (414) owns CPUs 442–446, I/O processor 440 and memory controller 450.

The common or shared memory in the system is comprised of memory subsystems 434 and 448 and memory descriptors 438 and 452. These are owned by the community 410. Thus, FIG. 4 describes the layout of the system as it would appear to the operating system instances.

Operating System Characteristics

As previously mentioned, the illustrative computer system can operate with several different operating systems in different partitions. However, conventional operating systems may need to be modified in some aspects in order to make them compatible with the inventive system, depending on how the system is configured. Some sample modifications for the illustrative embodiment are listed below:

1. Instances may need to be modified to include a mechanism for choosing a "primary" CPU in the partition to run the console and be a target for communication from other instances. The selection of a primary CPU can be done in a conventional manner using arbitration mechanisms or other conventional devices.

2. Each instance may need modifications that allow it to communicate and cooperate with the console program which is responsible for creating a configuration data block that describes the resources available to the partition in which the instance is running. For example, the instance should not probe the underlying hardware to determine what resources are available for usage by the instance. Instead, if it is passed a configuration data block that describes what resources that instance is allowed to access, it will need to work with the specified resources.

3. An instance may need to be capable of starting at an arbitrary physical address and may not be able to reserve any specific physical address in order to avoid conflicting with other operating systems running at that particular address.

4. An instance may need to be capable of supporting multiple arbitrary physical holes in its address space, if it is part of a system configuration in which memory is shared between partitions. In addition, an instance may need to deal with physical holes in its address space in order to support "hot inswap" of memory.

5. An instance may need to pass messages and receive notifications that new resources are available to partitions and instances. More particularly, a protocol is needed to inform an instance to search for a new resource. Otherwise, the instance may never realize that the resource has arrived and is ready for use.

6. An instance may need to be capable of running entirely within its "private memory" if it is used in a system where instances do not share memory. Alternatively, an instance may need to be capable of using physical "shared memory" for communicating or sharing data with other instances running within the computer if the instance is part of a system in which memory is shared. In such a shared memory system, an instance may need to be capable of mapping physical "shared memory" as identified in the configuration tree into its virtual address space, and the virtual address spaces of the "processes" running within that operating system instance.

7. Each instance may need some mechanism to contact another CPU in the computer system in order to communicate with it.

8. An instance may also need to be able to recognize other CPUs that are compatible with its operations, even if the CPUs are not currently assigned to its partition. For example, the instance may need to be able to ascertain CPU parameters, such as console revision number and clock speed, to determine whether it could run with that CPU, if the CPU was re-assigned to the partition in which the instance is running.

Changing the Configuration Tree

Each console program provides a number of callback functions to allow the associated operating system instance to change the configuration of the APMP system, for example, by creating a new community or partition, or altering the ownership of memory fragments. In addition, other callback functions provide the ability to remove a community, or partition, or to start operation on a newly-created partition.

However, callback functions do not cause any changes to take place on the running operating system instances. Any changes made to the configuration tree must be acted upon by each instance affected by the change. The type of action that must take place in an instance when the configuration tree is altered is a function of the type of change, and the operating system instance capabilities. For example, moving an input/output processor from one partition to another may require both partitions to reboot. Changing the memory allocation of fragments, on the other hand, might be handled by an operating system instance without the need for a reboot.

Configuration of an APMP system entails the creation of communities and partitions, and the assignment of unassigned components. When a component is moved from one partition to another, the current owner removes itself as owner of the resource and then indicates the new owner of the resource. The new owner can then use the resource. When an instance running in a partition releases a component, the instance must no longer access the component. This simple procedure eliminates the complex synchronization needed to allow blind stealing of a component from an instance, and possible race conditions in booting an instance during a reconfiguration.

Once initialized, configuration tree nodes will never be deleted or moved, that is, their handles will always be valid. Thus, hardware node addresses may be cached by software. Callback functions which purport to delete a partition or a community do not actually delete the associated node, or remove it from the tree, but instead flag the node as UNAVAILABLE, and clear the ownership fields of any hardware resource that was owned by the software component.

In order to synchronize changes to the configuration tree, the root node of the tree maintains two counters (transient_level and current_level). The transient_level counter is incremented at the start of an update to the tree, and the current_level counter is incremented when the update is complete. Software may use these counters to determine when a change has occurred, or is occurring to the tree. When an update is completed by a console, an interrupt can be generated to all CPUs in the APMP system. This interrupt can be used to cause system software to update its state based on changes to the tree.

Creation of an APMP Computer System

Figure 5:
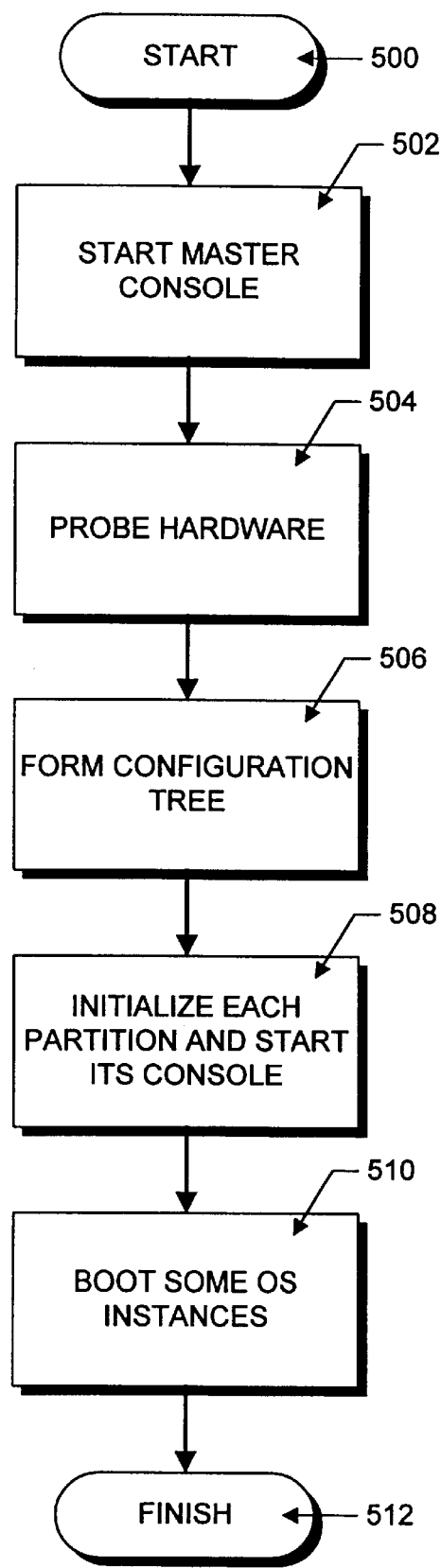
FIG. 5 is a flowchart illustrating the steps in an illustrative routine for creating a computer system in accordance with the principles of the present invention.

FIG. 5 is a flowchart that illustrates an overview of the formation of the illustrative adaptively-partitioned, multi-processor (APMP) computer system. The routine starts in step 500 and proceeds to step 502 where a master console program is started. If the APMP computer system is being created on power up, the CPU on which the master console runs is chosen by a predetermined mechanism, such as arbitration, or another hardware mechanism. If the APMP computer system is being created on hardware that is already running, a CPU in the first partition that tries to join the (non-existent) system runs the master console program, as discussed below.

Next, in step 504, the master console program probes the hardware and creates the configuration tree in step 506 as discussed above. If there is more than one partition in the APMP system on power up, each partition is initialized and its console program is started (step 508).

Finally, an operating system instance is booted in at least one of the partitions as indicated in step 510. The first operating system instance to boot creates an APMP database and fills in the entries as described below. APMP databases store information relating to the state of active operating system instances in the system. The routine then finishes in step 512. It should be noted that an instance is not required to participate in an APMP system. The instance can choose not to participate or to participate at a time that occurs well after boot. Those instances which do participate form a "sharing set." The first instance which decides to join a sharing set must create it there can be multiple sharing sets operating on a single APMP system and each sharing set has its own APMP database.

Deciding to Create a New APMP System or to Join an Existing APMP System

An operating system instance running on a platform which is also running the APMP computer system does not necessarily have to be a member of the APMP computer system. The instance can attempt to become a member of the APMP system at any time after booting. This may occur either automatically at boot, or after an operator-command explicitly initiates joining. After the operating system is loaded at boot time, the operating system initialization routine is invoked and examines a stored parameter to see whether it specifies immediate joining and, if so, the system executes a joining routine which is part of the APMP computer system. An operator command would result in an execution of the same routine.

APMP Database

An important data structure supporting the inventive software allocation of resources is the APMP database which keeps track of operating system instances which are members of a sharing set. The first operating system instance attempting to set up the APMP computer system initializes an APMP database, thus creating, or instantiating, the inventive software resource allocations for the initial sharing set. Later instances wishing to become part of the sharing set join by registering in the APMP database associated with that sharing set. The APMP database is a shared data structure containing the centralized information required for the management of shared resources of the sharing set. An APMP database is also initialized when the APMP computer system is reformed in response to an unrecoverable error.

More specifically, each APMP database is a three-part structure. The first part is a fixed-size header portion including basic synchronization structures for creation of the APMP computer system, address-mapping information for the database and offsets to the service-specific segments that make up the second portion. The second portion is an array of data blocks with one block assigned to each potential instance. The data blocks are called "node blocks." The third portion is divided into segments used by each of the computer system sub-facilities. Each sub-facility is responsible for the content of, and synchronizing access to, its own segment.

The initial, header portion of an APMP database is the first part of the APMP database mapped by a joining operating system instance. Portions of the header are accessed before the instance has joined the sharing set, and, in fact, before the instance knows that the APMP computer system exists.

The header section contains:
1. a membership and creation synchronization quadword
2. a computer system software version
3. state information, creation time, incarnation count, etc.
4. a pointer (offset) to a membership mask
5. crashing instance, crash acknowledge bits, etc.
6. validation masks, including a bit for each service
7. memory mapping information (page frame number information) for the entire APMP database
8. offset/length pairs describing each of the service segments (lengths in bytes rounded to pages and offsets full pages) including shared memory services
cpu communications services
membership services (if required)
locking services The array of node blocks is indexed by a system partition id (one per instance possible on the current platform) and each block contains:

instance software version
interrupt reason mask
instance state
instance incarnation
instance heartbeat
instance membership timestamp
little brother instance id and inactive-time; big brother instance id
instance validation done bit.

An APMP database is stored in shared memory. The initial fixed portion of N physically contiguous pages occupies the first N pages of one of two memory ranges allocated by the first instance to join during initial partitioning of the hardware. The instance directs the console to store the starting physical addresses of these ranges in the configuration tree. The purpose of allocating two ranges is to permit fail over in case of hardware memory failure. Memory management is responsible for mapping the physical memory into virtual address space for the APMP database.

Figure 6:
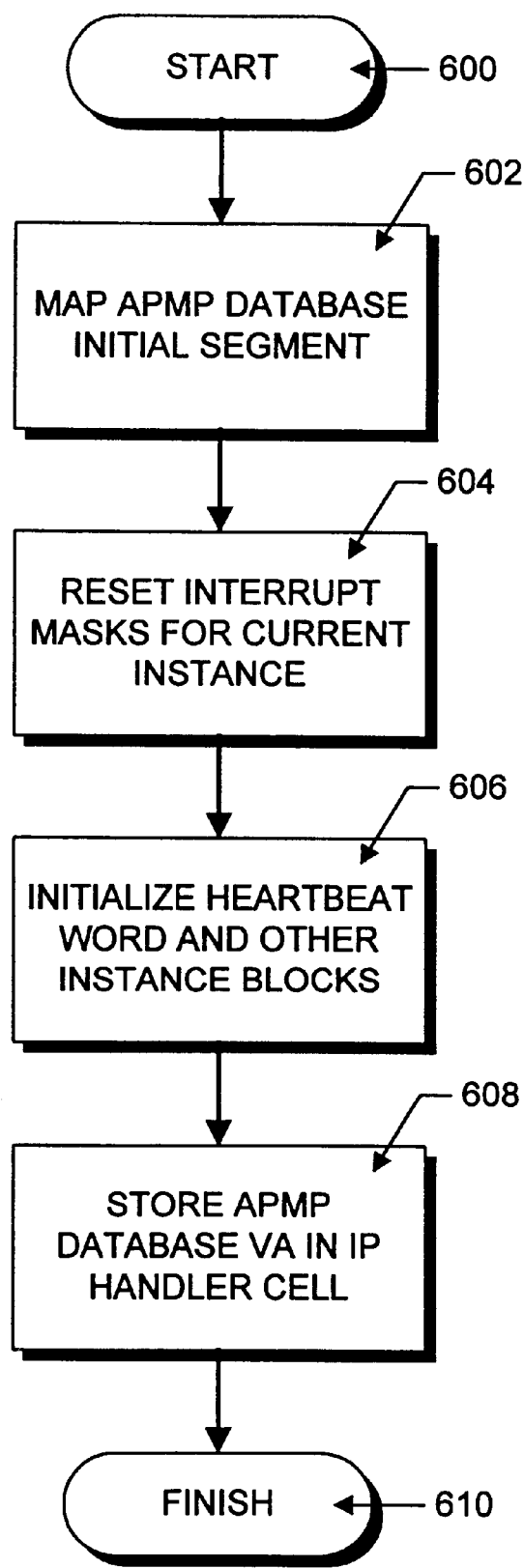
FIG. 6 is a flowchart illustrating the steps in an illustrative routine followed by all nodes before joining or creating a computer system.

The detailed actions taken by an operating system instance are illustrated in FIG. 6. More specifically, when an operating system instance wishes to become a member of a sharing set, it must be prepared to create the APMP computer system if it is the first instance attempting to "join" a non-existent system. In order for the instance to determine whether an APMP system already exists, the instance must be able to examine the state of shared memory as described above. Further, it must be able to synchronize with other instances which may be attempting to join the APMP system and the sharing set at the same time to prevent conflicting creation attempts. The master console creates the configuration tree as discussed above. Subsequently, a region of memory is initialized by the first, or primary, operating system instance to boot, and this memory region can be used for an APMP database.

Mapping the APMP Database Header

The goal of the initial actions taken by all operating system instances is to map the header portion of the APMP database and initialize primitive inter-instance interrupt handling to lay the groundwork for a create or join decision. The routine used is illustrated in FIG. 6 which begins in step 600. The first action taken by each instance (step 602) is to engage memory management to map the initial segment of the APMP database as described above. At this time, the array of node blocks in the second database section is also mapped. Memory management maps the initial and second segments of the APMP database into the primary operating system address space and returns the start address and length. The instance then informs the console to store the location and size of the segments in the configuration tree.

Next, in step 604, the initial virtual address of the APMP database is used to allow the initialization routine to zero interrupt reason masks in the node block assigned to the current instance.

A zero initial value is then stored to the heartbeat field for the instance in the node block, and other node block fields. In some cases, the instance attempting to create a new APMP computer system was previously a member of an APMP system and did not withdraw from the APMP system. If this instance is rebooting before the other instances have removed it, then its bit will still be "on" in the system membership mask. Other unusual or error cases can also lead to "garbage" being stored in the system membership mask.

Next, in step 608, the virtual address (VA) of the APMP database is stored in a private cell which is examined by an inter-processor interrupt handler. The handler examines this cell to determine whether to test the per-instance interrupt reason mask in the APMP database header for work to do. If this cell is zero, the APMP database is not mapped and nothing further is done by the handler. As previously discussed, the entire APMP database, including this mask, is initialized so that the handler does nothing before the address is stored. In addition, a clock interrupt handler can examine the same private cell to determine whether to increment the instance-specific heartbeat field for this instance in the appropriate node block. If the private cell is zero, the interrupt handler does not increment the heartbeat field.

At this point, the routine is finished (step 610) and the APMP database header is accessible and the joining instance is able to examine the header and decide whether the APMP computer system does not exist and, therefore, the instance must create it, or whether the instance will be joining an already-existing APMP system.

Once the APMP header is mapped, the header is examined to determine whether an APMP computer system is up and functioning, and, if not, whether the current instance should initialize the APMP database and create the APMP computer system. The problem of joining an existing APMP system becomes more difficult, for example, if the APMP computer system was created at one time, but now has no members, or if the APMP system is being reformed after an error. In this case, the state of the APMP database memory is not known in advance, and a simple memory test is not sufficient. An instance that is attempting to join a possibly existing APMP system must be able to determine whether an APMP system exists or not and, if it does not, the instance must be able to create a new APMP system without interference from other instances. This interference could arise from threads running either on the same instance or on another instance.

In order to prevent such interference, the create/join decision is made by first locking the APMP database and then examining the APMP header to determine whether there is a functioning APMP computer system. If there is a properly functioning APMP system, then the instance joins the system and releases the lock on the APMP database. Alternatively, if there is no APMP system, or if the there is an APMP system, but it is non-functioning, then the instance creates a new APMP system, with itself as a member and releases the lock on the APMP database.

If there appears to be an APMP system in transition, then the instance waits until the APMP system is again operational or dead, and then proceeds as above. If a system cannot be created, then joining fails.

Creating a new APMP Computer System

Figure 7A:
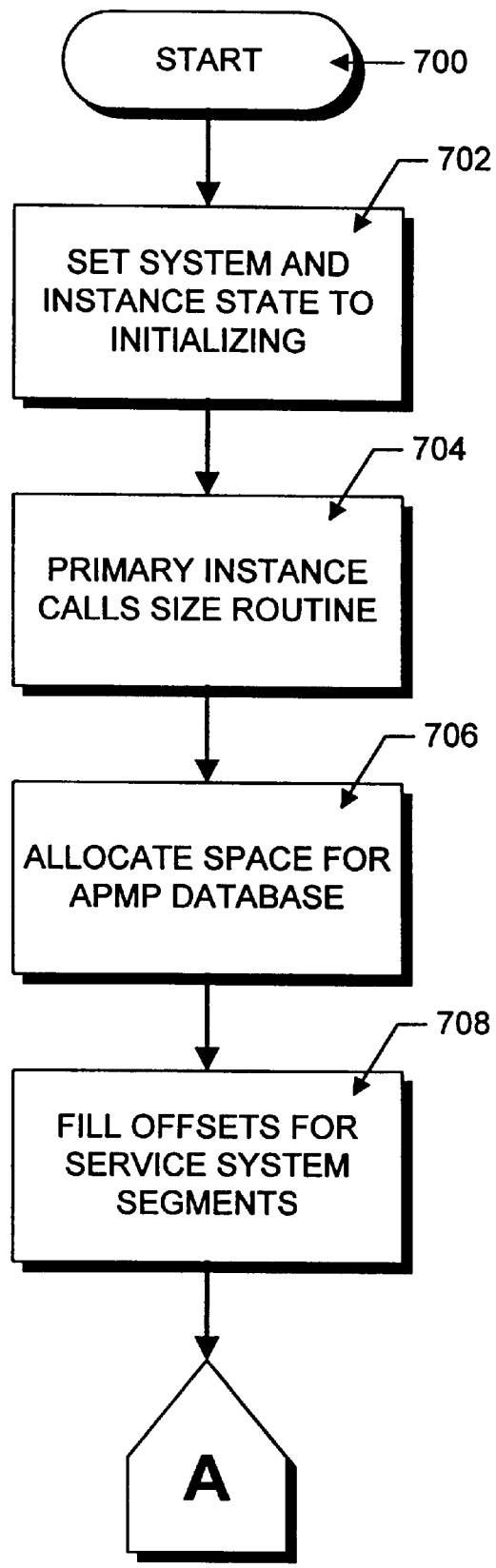
FIGS. 7A and 7B, when placed together, form a flowchart illustrating the steps in an illustrative routine followed by a node to create a computer system in accordance with the principles of the present invention.
Figure 7B:
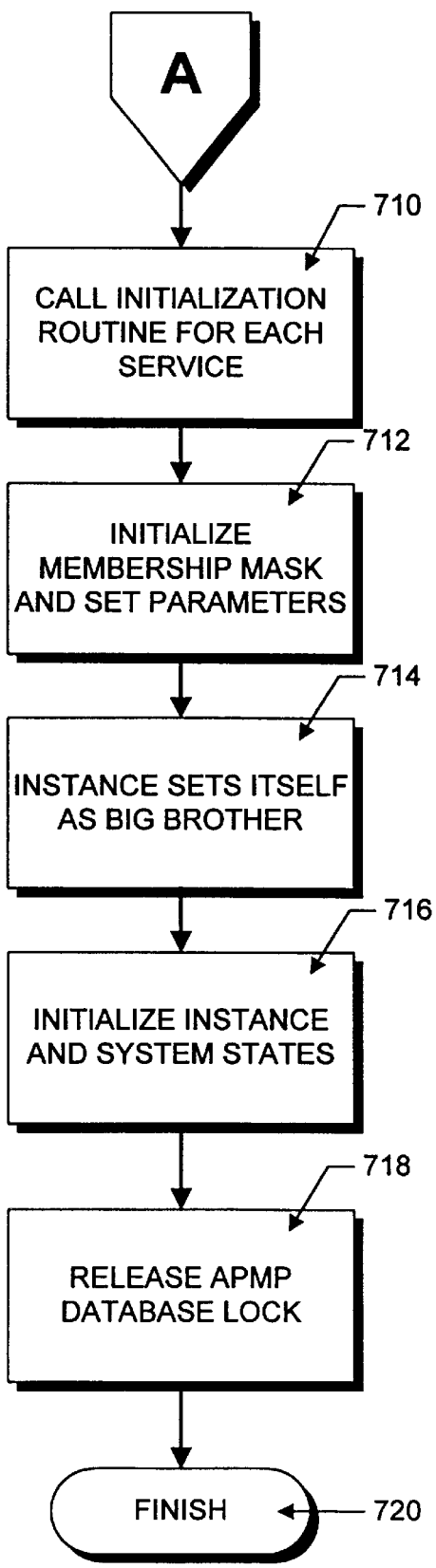

Assuming that a new APMP system must be created, the creator instance is responsible for allocating the rest of the APMP database, initializing the header and invoking system services. Assuming the APMP database is locked as described above, the following steps are taken by the creator instance to initialize the APMP system (these steps are shown in FIGS. 7A and 7B):

| | |
|---|---|
| Step 702 | the creator instance sets the APMP system state and its node block state to "initializing." |
| Step 704 | the creator instance calls a size routine for each system service with the address of its length field in the header. |
| Step 706 | the resulting length fields are summed and the creator instance calls memory management to allocate space for the entire APMP database by creating a new mapping and deleting the old mapping. |
| Step 708 | the creator instance fills in the offsets to the beginnings of each system service segment. |
| Step 710 | the initialization routine for each service is called with the virtual addresses of the APMP database, the service segment and the segment length. |
| Step 712 | the creator instance initializes a membership mask to make itself the sole member and increments an incarnation count. It then sets creation time, software version, and other creation parameters. |
| Step 714 | the instance then sets itself as its own big and little brother (for heartbeat monitoring purposes as described below). |
| Step 716 | the instance then fills in its instance state as "member" and the APMP system state as "operational." |
| Step 718 | finally, the instance releases the APMP database lock. The routine then ends in step 720. |

Joining an Existing APMP Computer System

Figure 8A:
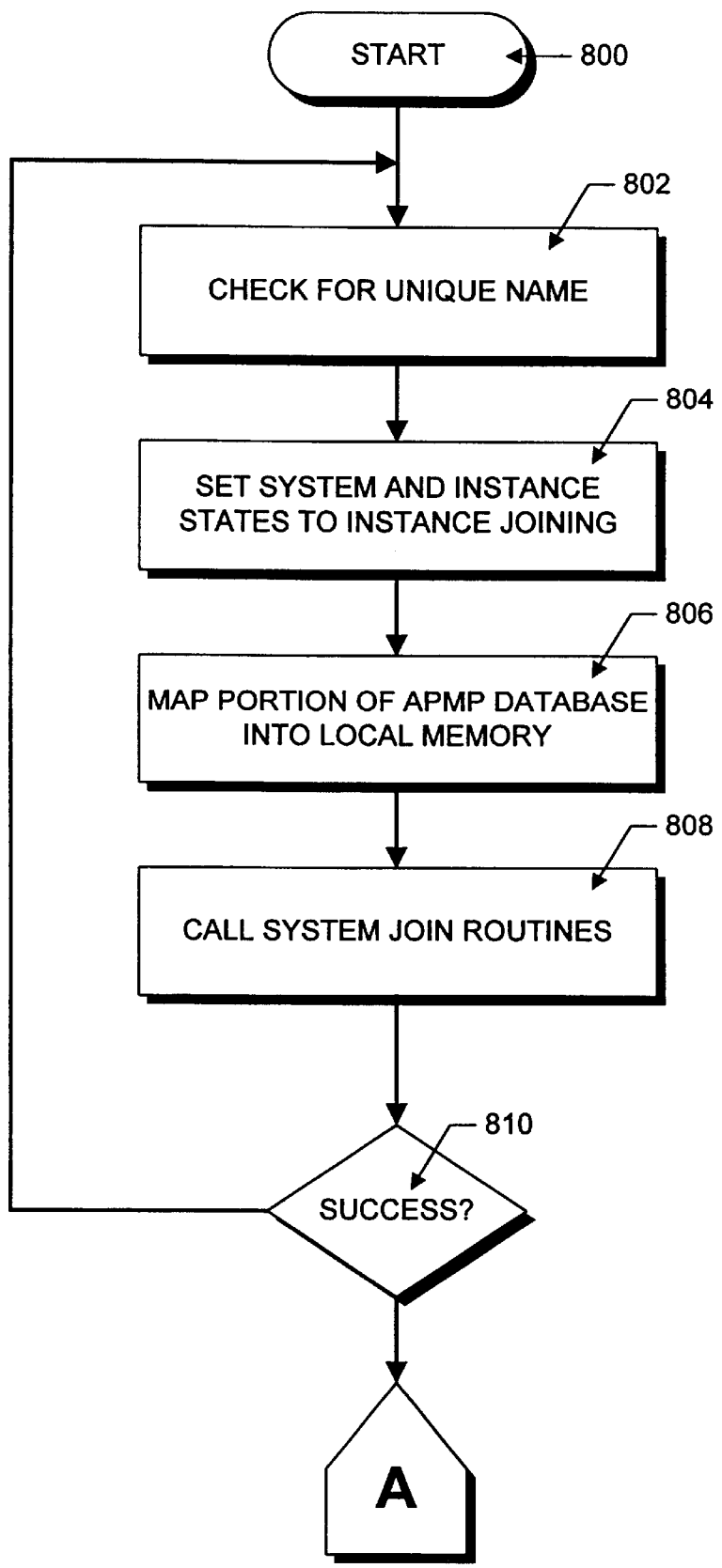
FIGS. 8A and 8B, when placed together, form a flowchart illustrating the steps in an illustrative routine followed by a node to join a computer system which is already created.
Figure 8B:
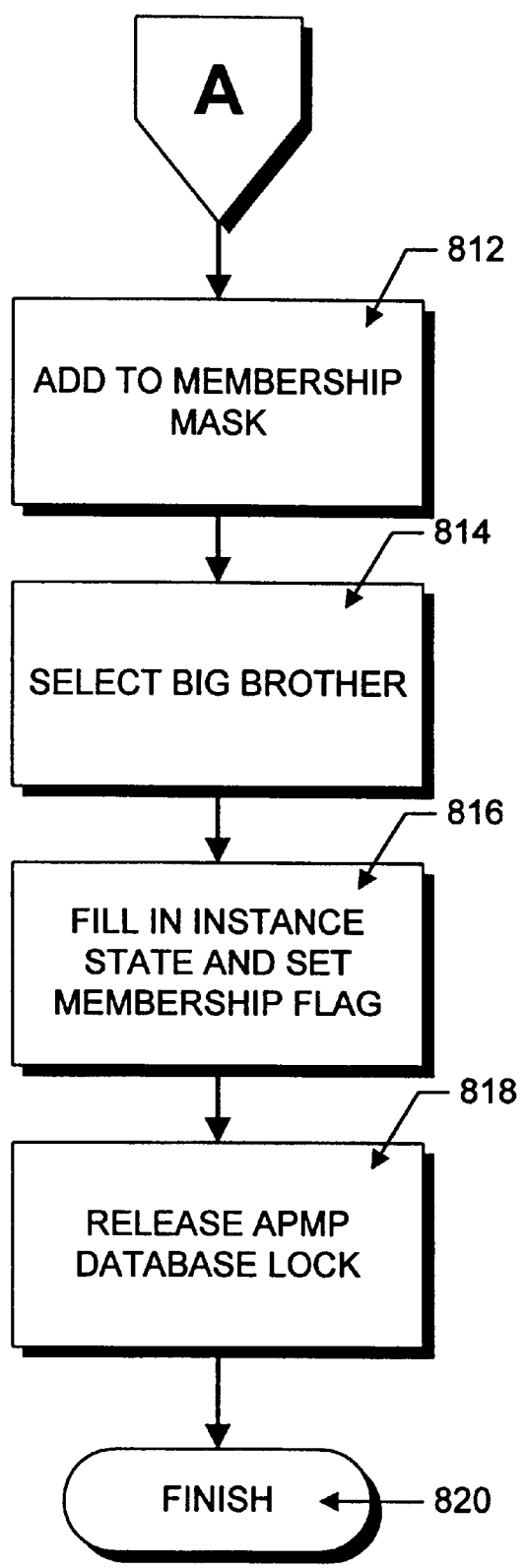

Assuming an instance has the APMP database locked, the following steps are taken by the instance to become a member of an existing APMP system (shown in FIGS. 8A and 8B):

| | |
|---|---|
| Step 802 | the instance checks to make sure that its instance name is unique. If another current member has the instance's proposed name, joining is aborted. |
| Step 804 | the instance sets the APMP system state and its node block state to "instance joining" |
| Step 806 | the instance calls a memory management routine to map the variable portion of the APMP database into its local address space. |
| Step 808 | the instance calls system joining routines for each system service with the virtual addresses of the APMP database and its segment and its segment length. |
| Step 810 | if all system service joining routines report success, then the instance joining routine continues. If any system service join routine fails, the instance joining process must start over and possibly create a new APMP computer system. |
| Step 812 | assuming that success was achieved in step 810, the instance adds itself to the system membership mask. |
| Step 814 | the instance selects a big brother to monitor its instance health as set forth below. |
| Step 816 | the instance fills in its instance state as "member" and sets a local membership flag. |
| Step 818 | the instance releases the configuration database lock. The routine then ends in step 820. |

The loss of an instance, either through inactivity timeout or a crash, is detected by means of a "heartbeat" mechanism implemented in the APMP database. Instances will attempt to do minimal checking and cleanup and notify the rest of the APMP system during an instance crash. When this is not possible, system services will detect the disappearance of an instance via a software heartbeat mechanism. In particular, a "heartbeat" field is allocated in the APMP database for each active instance. This field is written to by the corresponding instance at time intervals that are less than a predetermined value, for example, every two milliseconds.

Any instance may examine the heartbeat field of any other instance to make a direct determination for some specific purpose. An instance reads the heartbeat field of another instance by reading its heartbeat field twice separated by a two millisecond time duration. If the heartbeat is not incremented between the two reads, the instance is considered inactive (gone, halted at control-P, or hung at or above clock interrupt priority level.) If the instance remains inactive for a predetermined time, then the instance is considered dead or disinterested.

In addition, a special arrangement is used to monitor all instances because it is not feasible for every instance to watch every other instance, especially as the APMP system becomes large. This arrangement uses a "big brother-little brother" scheme. More particularly, when an instance joins the APMP system, before releasing the lock on the APMP database, it picks one of the current members to be its big brother and watch over the joining instance. The joining instance first assumes big brother duties for its chosen big brother's current little brother, and then assigns itself as the new little brother of the chosen instance. Conversely, when an instance exits the APMP computer system while still in operation so that it is able to perform exit processing, and while it is holding the lock on the APMP database, it assigns its big brother duties to its current big brother before it stops incrementing its heartbeat.

Every clock tick, after incrementing its own heartbeat, each instance reads its little brother's heartbeat and compares it to the value read at the last clock tick. If the new value is greater, or the little brother's ID has changed, the little brother is considered active. However, if the little brother ID and its heartbeat value are the same, the little brother is considered inactive, and the current instance begins watching its little brother's little brother as well. This accumulation of responsibility continues to a predetermined maximum and insures that the failure of one instance does not result in missing the failure of its little brother. If the little brother begins incrementing its heartbeat again, all additional responsibilities are dropped.

If a member instance is judged dead, or disinterested, and it has not notified the APMP computer system of its intent to shut down or crash, the instance is removed from the APMP system. This may be done, for example, by setting the "bugcheck" bit in the instance primitive interrupt mask and sending an IP interrupt to all CPU's of the instance. As a rule, shared memory may only be accessed below the hardware priority of the IP interrupt. This insures that if the CPUs in the instance should attempt to execute at a priority below that of the IP interrupt, the IP interrupt will occur first and thus the CPU will see the "bugcheck" bit before any lower priority threads can execute. This insures the operating system instance will crash and not touch shared resources such as memory which may have been reallocated for other purposes when the instances were judged dead. As an additional or alternative mechanism, a console callback (should one exist) can be invoked to remove the instance. In addition, in accordance with a preferred embodiment, whenever an instance disappears or drops out of the APMP computer system without warning, the remaining instances perform some sanity checks to determine whether they can continue. These checks include verifying that all pages in the APMP database are still accessible, i.e. that there was not a memory failure.

Assignment of Resources After Joining

A CPU can have at most one owner partition at any given time in the power-up life of an APMP system. However, the reflection of that ownership and the entity responsible for controlling it can change as a result of configuration and state transitions undergone by the resource itself, the partition it resides within, and the instance running in that partition.

CPU ownership is indicated in a number of ways, in a number of structures dictated by the entity that is managing the resource at the time. In the most basic case, the CPU can be in an unassigned state, available to all partitions that reside in the same sharing set as the CPU. Eventually that CPU is assigned to a specific partition, which may or may not be running an operating system instance. In either case, the partition reflects its ownership to all other partitions through the configuration tree structure, and to all operating system instances that may run in that partition through the AVAILABLE bit in the HWRPB per-CPU flags field.

If the owning partition has no operating system instance running on it, its console is responsible for responding to, and initiating, transition events on the resources within it. The console decides if the resource is in a state that allows it to migrate to another partition or to revert back to the unassigned state.

If, however, there is an instance currently running in the partition, the console relinquishes responsibility for initiating resource transitions and is responsible for notifying the running primary of the instance when a configuration change has taken place. It is still the facilitator of the underlying hardware transition, but control of resource transitions is elevated one level up to the operating system instance. The transfer of responsibility takes place when the primary CPU executes its first instruction outside of console mode in a system boot.

Operating system instances can maintain ownership state information in any number of ways that promote the most efficient usage of the information internally. For example, a hierarchy of state bit vectors can be used which reflect the instance-specific information both internally and globally (to other members sharing an APMP database).

The internal representations are strictly for the use of the instance. They are built up at boot time from the underlying configuration tree and HWRPB information, but are maintained as strict software constructs for the life of the operating system instance. They represent the software view of the partition resources available to the instance, and may—through software rule sets—further restrict the configuration to a subset of that indicated by the physical constructs. Nevertheless, all resources in the partition are owned and managed by the instance—using the console mechanisms to direct state transitions—until that operating system invocation is no longer a viable entity. That state is indicated by halting the primary CPU once again back into console mode with no possibility of returning without a reboot.

Ownership of CPU resources never extends beyond the instance. The state information of each individual instance is duplicated in an APMP database for read-only decision-making purposes, but no other instance can force a state transition event for another's CPU resource. Each instance is responsible for understanding and controlling its own resource set; it may receive external requests for its resources, but only it can make the decision to allow the resources to be transferred.

When each such CPU becomes operational, it does not set its AVAILABLE bit in the per-CPU flags. When the AVAILABLE bit is not set, no instance will attempt to start, nor expect the CPU to join in SMP operation. Instead, the CPU, in console mode, polls the owner field in the configuration tree waiting for a valid partition to be assigned. Once a valid partition is assigned as the owner by the primary console, the CPU will begin operation in that partition.

During runtime, the current_owner field reflects the partition where a CPU is executing. The AVAILABLE bit in the per-CPU flags field in the HWRPB remains the ultimate indicator of whether a CPU is actually available, or executing, for SMP operation with an operating system instance, and has the same meaning as in conventional SMP systems.

It should be noted that an instance need not be a member of a sharing set to participate in many of the reconfiguration features of an APMP computer system. An instance can transfer its resources to another instance in the APMP system so that an instance which is not a part of a sharing set can transfer a resource to an instance which is part of the sharing set. Similarly, the instance which is not a part of the sharing set can receive a resource from an instance which is part of the sharing set.

Figure 9:
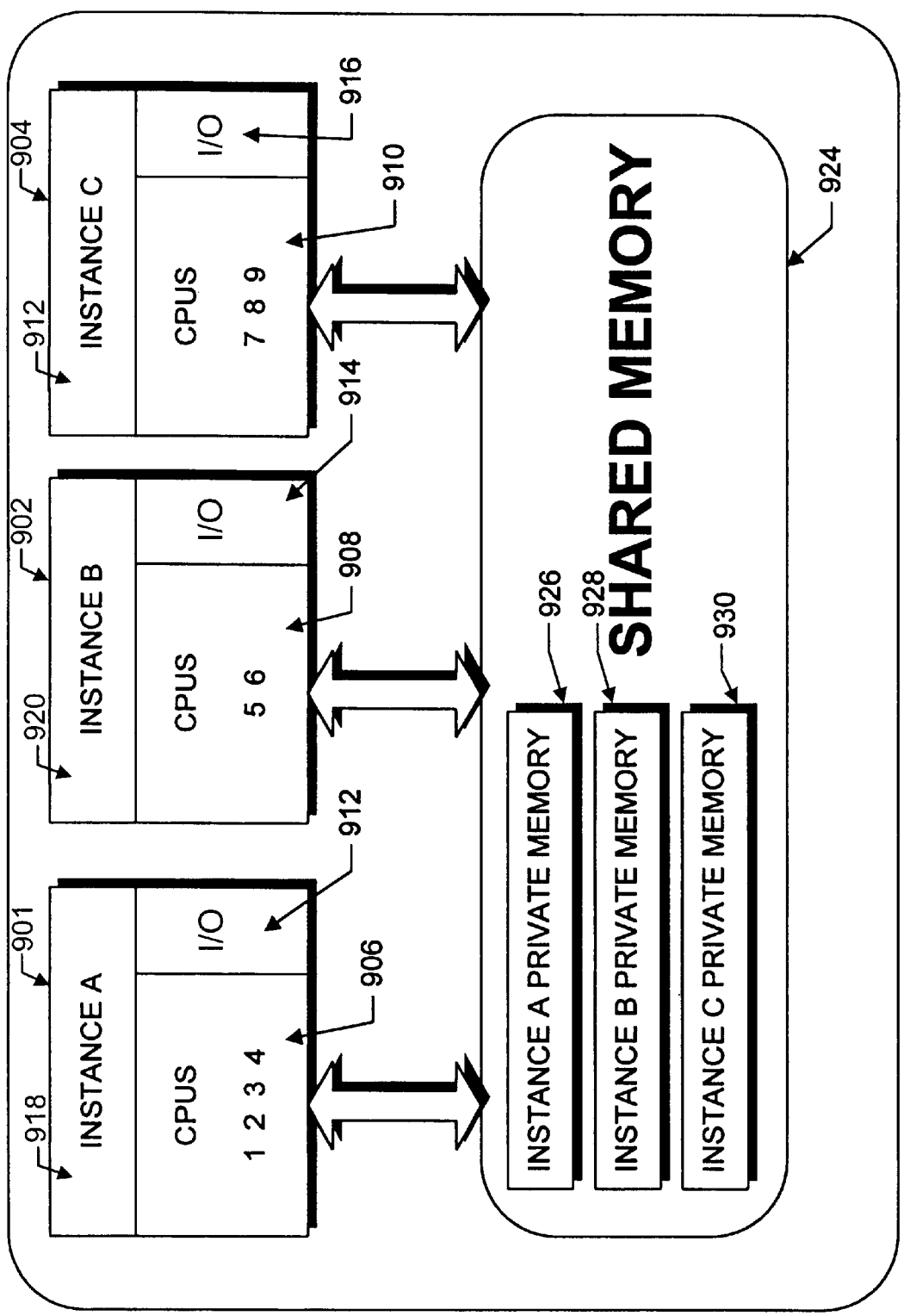
FIG. 9 is a block schematic diagram illustrating an overview of the inventive system.

Using the above-described computer system, various system configurations can be achieved simply by appropriately manipulating the configuration tree. FIG. 9 is an overview which shows what the architectural description looks like when the inventive computer system is instantiated on a machine. This example is a nine CPU SMP machine 900 that has been partitioned into three partitions, 901, 902 and 904. Each partition has one or more CPUs (groups 906, 908 and 910) and some private I/O resources (designated as 912, 914 and 916) and is running an instance of an operating system (illustrated schematically as 918, 920 and 922). The operating systems may be three copies of the same operating system or three different operating systems. The memory in this system is cache-coherent shared memory. The common memory 924 has been partitioned into three segments of private memory, 926, 928 and 930, one for each operating system instance, and the remainder 932 is shared memory for all three operating system instances to use cooperatively.

A configuration such as that illustrated schematically in FIG. 9 can be created by appropriate entries in the configuration tree illustrated in FIGS. 3 and 4. What has been created is the equivalent of three physically independent computers within a single computer. This construction is the basis for one embodiment of the inventive computer system—multiple independent instances of operating systems executing cooperatively in a single computer. The inventive computer system is a set of coordinated heterogeneous operating systems, in a single computer, communicating via shared memory. An instance of the operating system in such a system can be clustered with other operating system instances within the same computer system or with operating system instances in other computer systems.

Any instance on an operating system in the inventive computer system can be an SMP configuration. The number of CPUs is part of the definition of an instance and is determined by the configuration tree entries. Because an instance in the inventive system is a complete operating system, all applications behave the same as they would on a traditional, single-instance computer. For example, existing single-system applications will run without changes on instances in a the inventive computer system. Existing cluster applications will also run without changes on clustered instances in an operating system within the system. The system is more available than the traditional single-system-view SMP system because multiple instances of operating systems are running in the system. Consequently, if a single instance fails, other instances can continue to run in spite of the hardware or software error that caused the failure.

In such a system, memory 924 is logically partitioned into private (926, 928 and 930) and shared sections (932). As a minimum, each operating system instance has its own private memory section. No other instance can map into this physical memory section, except under direction of the owning operating system instance. Some of the shared memory 924 is available for instances of operating systems (918, 920 and 912) to communicate with one another, and the rest of the shared memory is available for applications.

In the inventive system, the I/O subsystem is also scalable. Because there are multiple "primary" CPUs in the system—one for each instance, there is better load balancing of the I/O workload. In addition, I/O controllers can support distributing I/O to secondary CPUs in an SMP system, further balancing the I/O workload.

Although there are three separate operating system instances in FIG. 9, there is an expectation of cooperation between the instances. Such cooperation can be defined in three broad categories or computing models:

1) Shared Nothing—the operating system instances do not share any resources but agree to cooperate by not interfering with each other.

2) Shared Partial (shared something)—the operating system instances agree to cooperate and share some limited resources, such as memory or storage.

3) Shared Everything—the operating system instances agree to cooperate fully and share all resources available, to the point where the operating system instances present a single cohesive entity to the network. For example, the operating system instances may appear to the user as an OpenVMS Cluster.

Even though some operating system instances are sharing resources, one or more operating system instances can execute in total software isolation from all others. An instance that exists without sharing any resources is called an independent instance and does not participate at all in shared memory use. More particularly, neither the base operating system, nor its applications, access shared memory. The inventive computer system could consist solely of independent instances; such a system would resemble traditional mainframe style partitioning.

Figure 10:
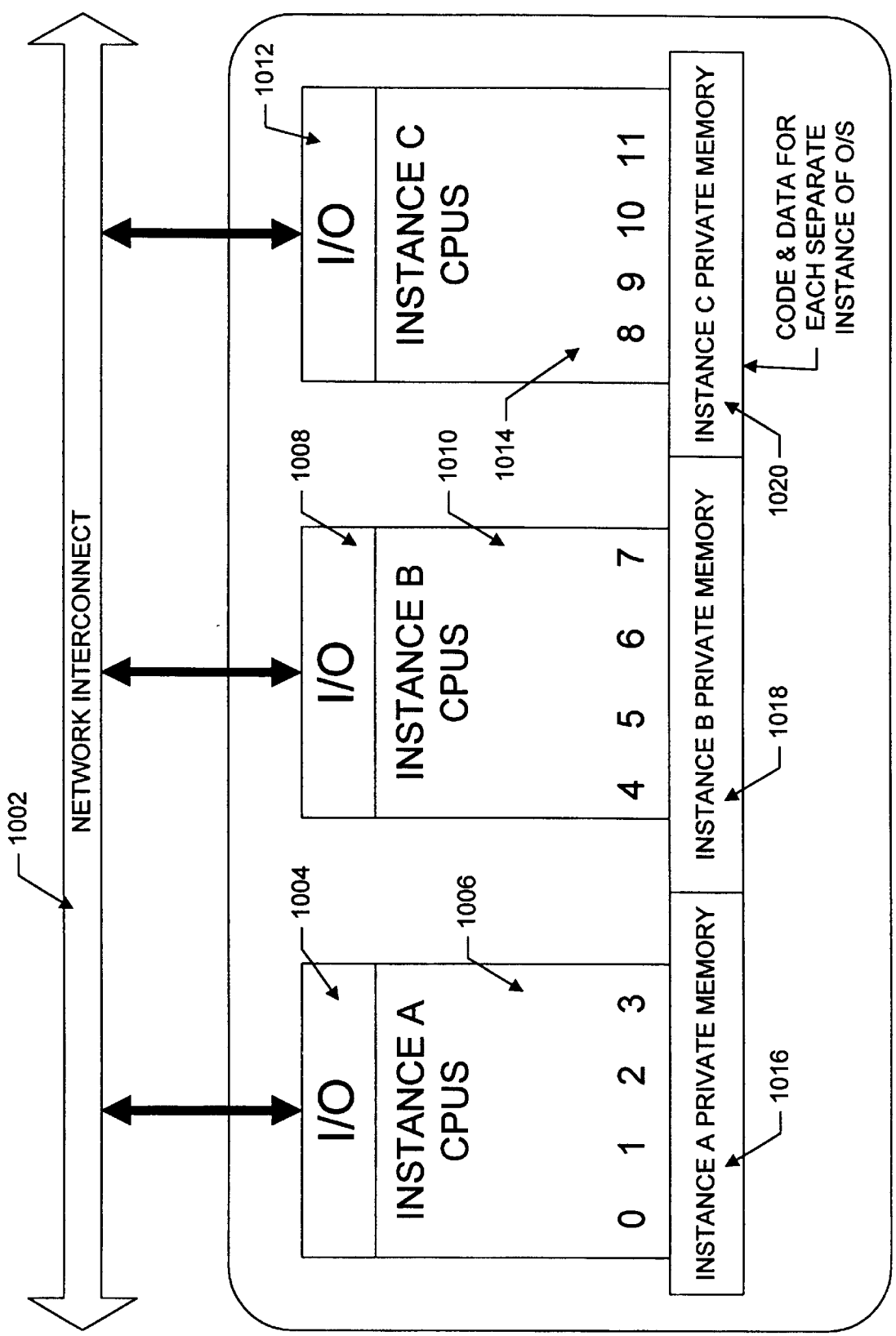
FIG. 10 is a block schematic diagram illustrating the inventive computing system operating as a shared nothing computing system.

FIG. 10 shows how the inventive system can be configured to support a "shared nothing" model of computing. In this example, three partitions, 1006, 1010 and 1014, have been created within a single machine 1000, each running an instance of an operating system. The available twelve CPUs have been split arbitrarily equally between the partitions in this example, 1006, 1010 and 1014, as illustrated. The available memory has been divided into private memory and assigned to the instances. In FIG. 10, private memory divisions 1016, 1018 and 1020 are illustrated. Both code and data for each instance is stored in the the private memory assigned to that instance. Although the memory, 1016, 1018 and 1020 has been illustrated in FIG. 10 as divided equally, the inventive architecture supports arbitrary division of memory between instances. Thus, if a partition has large memory requirements, and another that has limited memory needs, the system can accommodate both, in order to maximize use of available memory.

Each partition also has private I/O controllers/disks illustrated as I/O portions 1004, 1008 and 1012. Just as memory is arbitrarily divided, the same characteristic is true of I/O circuitry. In the "shared nothing" arrangement illustrated in FIG. 10, the available I/O resources are private to each partition, but do not have to be evenly divided. The partitions 1006, 1010 and 1014 can be networked together over a physical link 1002 within the machine, and that link can be extended off the machine to other computers.

What has just been created is the equivalent of three physically separate machines networked together. The difference between a conventional computer system and the inventive system is that, instead of having three physical boxes, there is only one box. Also, the exact configuration of each partition need not be determined until machine deployment. Another unique feature of the inventive system is the ability to dynamically configure the number/size of the partitions after machine deployment.

Figure 11:
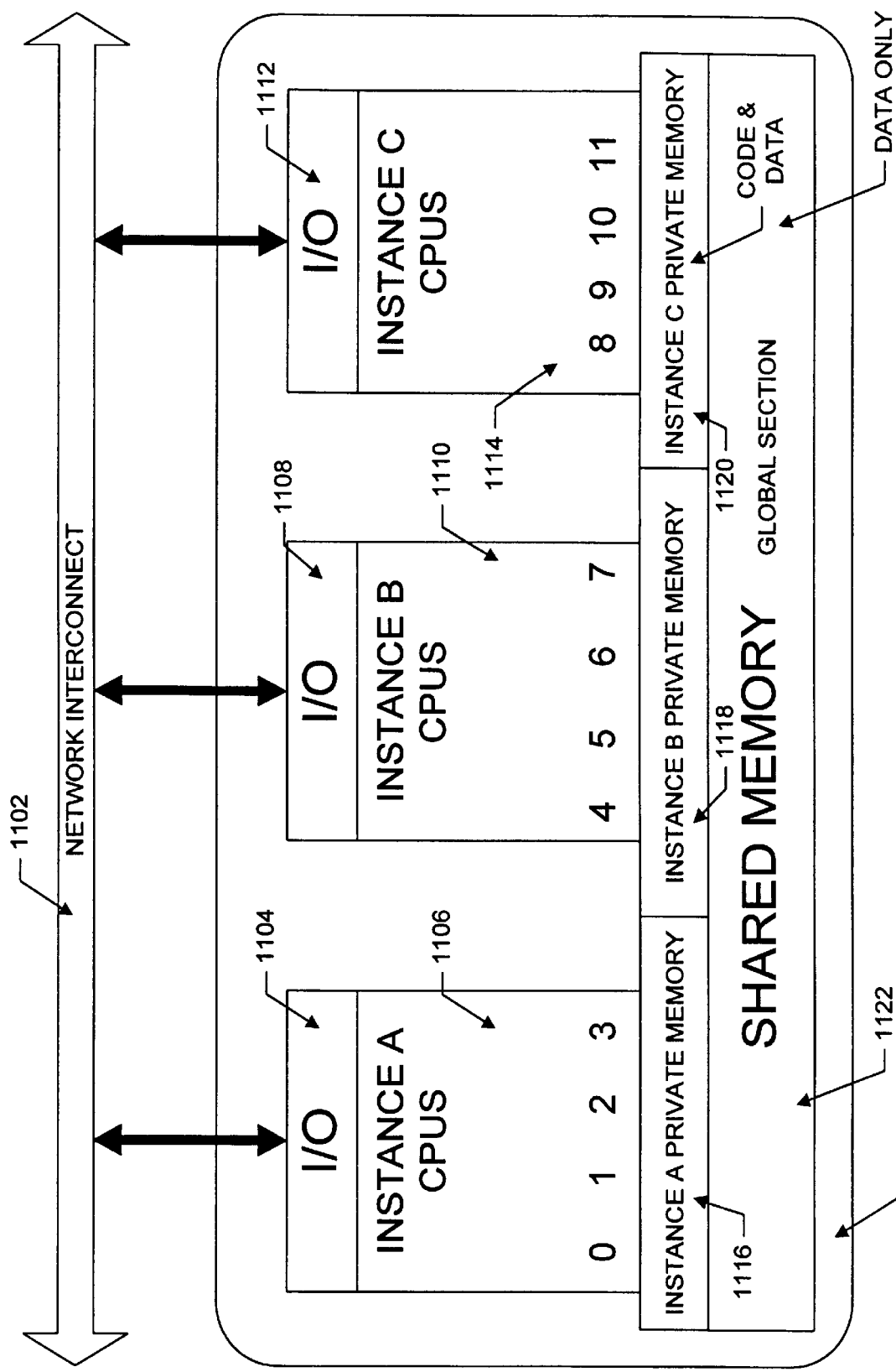
FIG. 11 is a block schematic diagram illustrating the inventive computing system operating as a shared partial computing system.

FIG. 11 illustrates the inventive system configured as a shared-partial model in which the partitions share memory. In FIG. 11, elements which correspond to elements in FIG. 10 have been given corresponding numerals. For example, machine 1000 in FIG. 10 has been designated as machine 1100 in FIG. 11. As before, each partition 1106, 1110 and 1114, has its own private memory section, 1116, 1118 and 1120, respectively, in which code and data for that instance are stored. However, in this configuration, there is also a shared memory section 1122 in which data and/or code accessible by all instances 1106, 1110 and 1114 is stored. The three instances, 1106, 1110 and 1114, are also networked together by interconnect 1102.

The advantage of the configuration illustrated in FIG. 11 is that large shared cache memories (for example, databases or file systems) can now be created and used jointly by several instances. The system also has the advantage that an instance of an operating system can deactivate or leave the configuration, and upon rejoining, can re-map into a still active cache memory. As cache memories become larger, this ability to remap into an existing memory is extremely important since it is very time-consuming to load all entries in very large cache memories into a private memory space.

Figure 12:
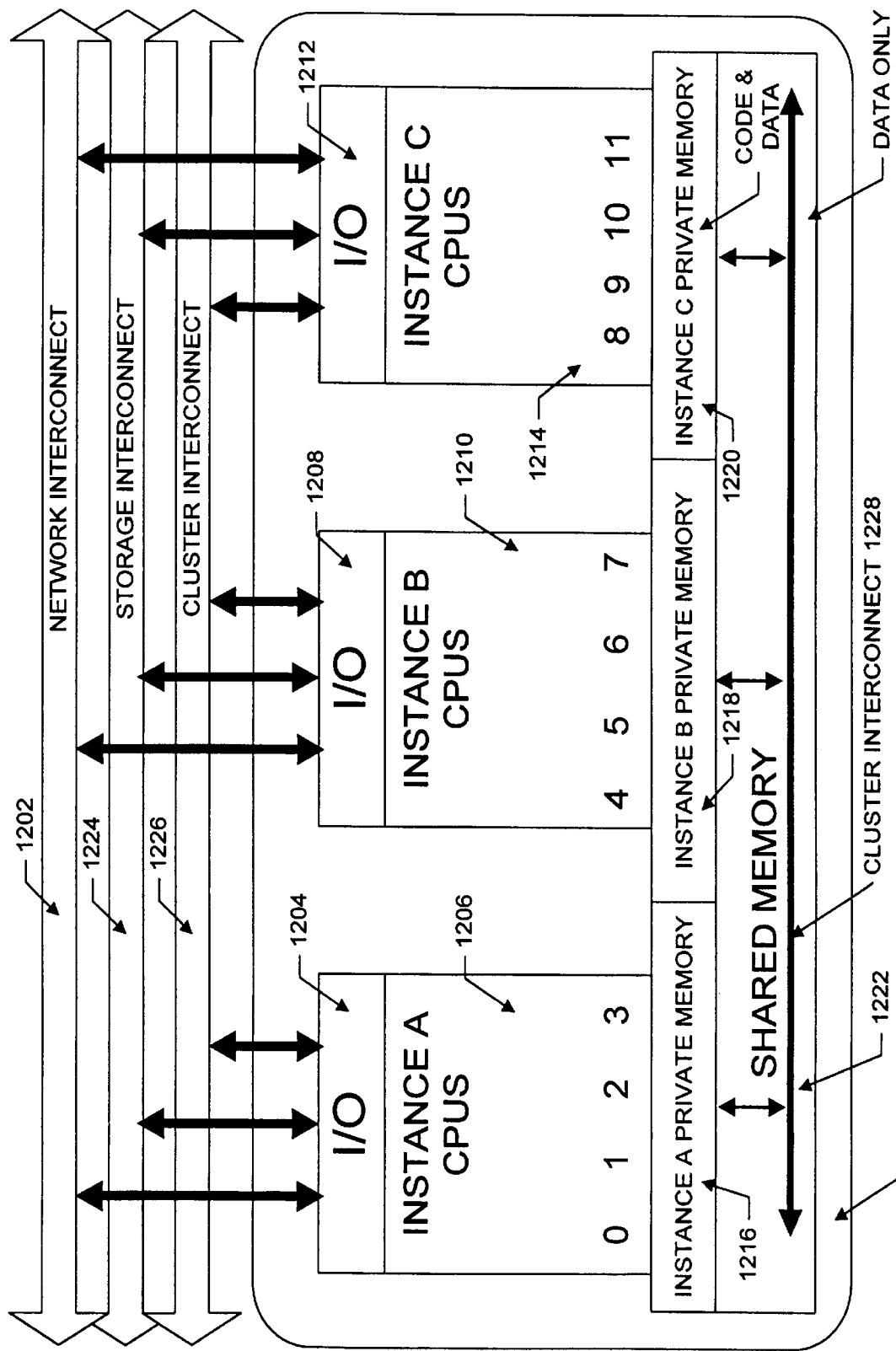
FIG. 12 is a block schematic diagram illustrating the inventive computing system operating as a shared everything computing system.

FIG. 12 illustrates the inventive system configured to operate as a "shared everything" computer system. As with FIG. 11, elements in FIG. 12 that correspond to similar elements in FIG. 10 and 11 have been given corresponding numerals. Each partition, 1206, 1210 and 1214, still has its own private memory, 1216, 1218 and 1220, respectively, in which code and data for that instance are stored. There is also a shared memory section 1222 in which data is stored. The three instances are networked together by interconnect 1202, but there is also a storage interconnect 1224 and a cluster interconnect 1226. Configuring the system for shared everything computing also brings the following advantages:

1) a distributed lock manager (not shown) can use shared memory 1222 to store its lock cache (not shown), thus increasing lock performance.

2) a cluster interconnect 1228 can be placed in shared memory 1222, instead of using independent hardware, thus increasing cluster communication performance if the instances 1206, 1210 and 1214 are clustered.

3) partitions can be created for highly specialized functions. For example, a partition could be created without I/O controllers (not shown), effectively making it a "compute engine".

With the inventive system, it is possible to run all three computing models illustrated in FIGS. 10, 11 and 12 within a single computer box by appropriate configuration of partitions. That is, some partitions can operate as "shared nothing" computers. A separate group of partitions can operate as a "shared partial" computing system and a still further group of partitions can operate as a "shared everything" computing system. Further, it is possible for a given instance to simultaneously operate in a "shared partial" configuration with one set of instances and operate in a "shared everything" configuration with another (and completely separate) set of instances.

Regardless of the computing model, or combination of models, that are run under the inventive architecture, the ability to dynamically re-allocate resources is possible without affecting the integrity of any of the operating system instances. Specifically, the ability to migrate CPUs and memory between partitions is supported. Thus, the system offers the possibility of a more linear scaling of system resources because system managers can assign resources to match application requirements as business needs grow or change. When a CPU is added to an inventive computer configuration, it can be assigned to any instance of operating system and reassigned later during system operation so that a "trial and error" method of assigning resources is a viable strategy. In particular, system managers can migrate CPUs among instances of operating systems until the most effective combination of resources is found. All instances of operating systems and their applications continue to run as CPUs are migrated. Finally, the distribution of interrupts across instances provides many I/O configuration possibilities; for example, a system's I/O workload can be partitioned so that certain I/O traffic is done on specific instances.

Figure 13:
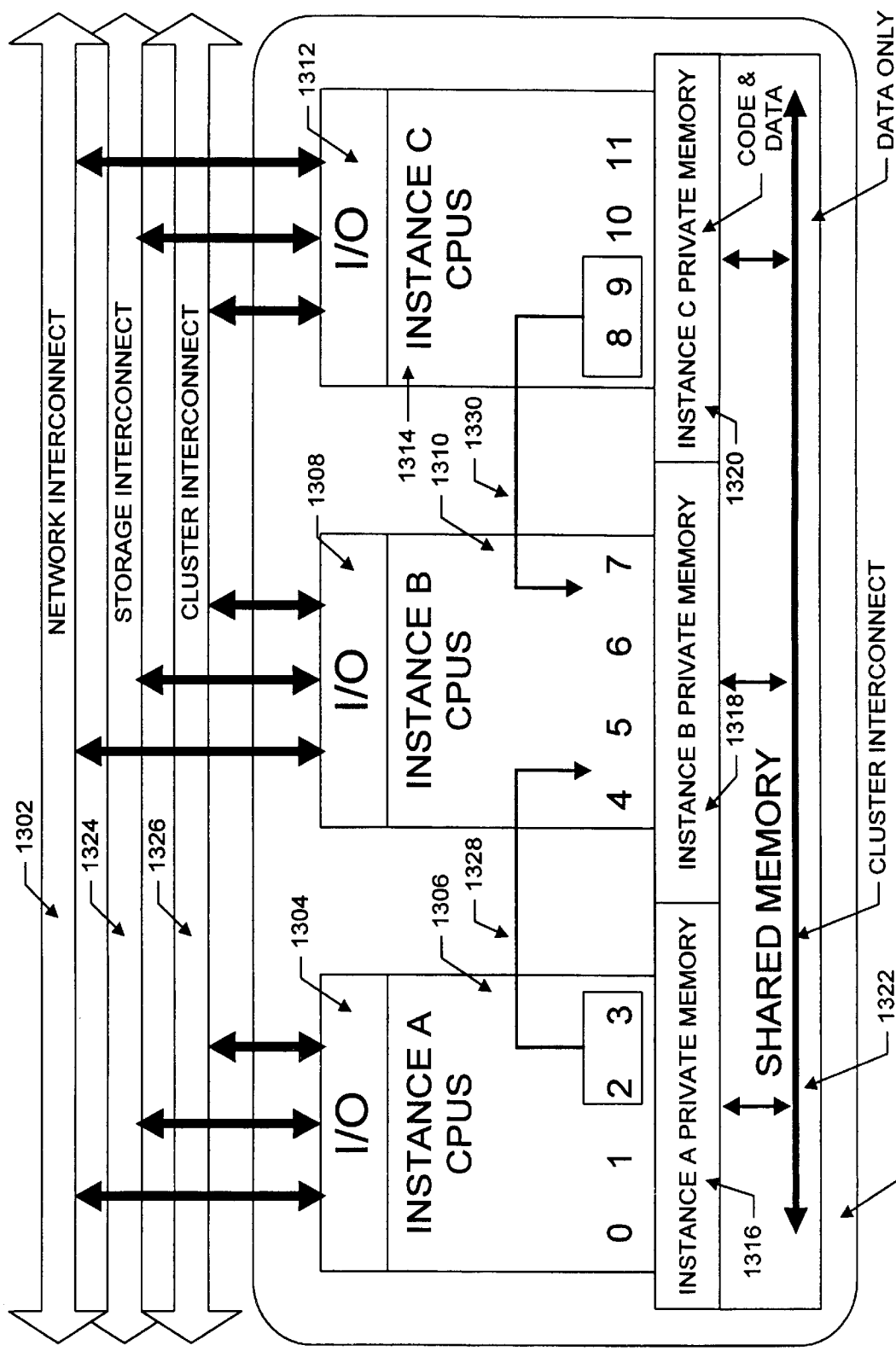
FIG. 13 is a block schematic diagram illustrating migration of CPUs in the inventive computing system.

The inventive system can also transfer resources while the system is running. Thus, a component, such as a CPU, can be moved from one instance to another while the system electrical power remains on and the rest of the hardware system continues to run. This is illustrated in FIG. 13. As with FIGS. 11 and 12, elements in FIG. 13 that correspond to similar elements in FIGS. 10, 11 and 12 have been given corresponding numerals. FIG. 13 illustrates the migration of CPUs 2 and 3 and CPUs 8 and 9 into instance 1310 as schematically illustrated by arrows 1328 and 1330, respectively. This migration creates an instance 1310 with eight CPUs. With such an arrangement, the instances are not required to operate in a "shared everything" configuration; the instances can be operating in any of the resource sharing levels and still fully support resource migration.

The inventive system allows individual I/O subsystems to be quiesced by nature of the fact that an operating system instance running in a partition can be shut down without impacting the remaining partitions. In general, if the hardware continues to run except for the component being swapped, the software keeps as many of the instances and their applications as possible running. The invention also supports "hot inswapping" which is a hardware feature that allows resources to be added to the system while the system is operating and electrical power is applied. An example of hot inswapping is additional memory. Assuming an operating system instance on a particular partition is capable of dynamically mapping additional memory, the system can absorb hot inswapped memory into the active computing environments running in the machine.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device, over a medium. The medium can be either a tangible medium, including but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system and operating system, other hardware and operating system software could be used in the same manner as that described. Other aspects, such as the specific instructions utilized to achieve a particular function, as well as other modifications to the inventive concept are intended to be covered by the appended claims.

What is claimed is:

1. A computer system having a plurality of configurable system resources including processors, memory, and I/O circuitry different from the memory, the computer system comprising:

an interconnection mechanism which electrically interconnects hardware components including the processors, memory and I/O circuitry so that each processor has electrical access to all of the memory and at least some of the I/O circuitry, such that the memory is configurable to allow data access by any one or more of the processors; and a software mechanism that divides at least a portion of the plurality of system resources into a plurality of soft partitions, each soft partition including at least one processor, some private memory and some private I/O circuitry, with at least one operating system instance running in each soft partition;

wherein a first pair of operating system instances share a first subset of the plurality of system resources as a first sharing set, and wherein a second pair of operating system instances share a second subset of the plurality of system resources different from the first subset of operating system resources as a second sharing set; and wherein each of said hardware components has an associated affinity handle which specifies a configuration that is more optimal than other possible configurations.

2. A computer system according to claim 1 wherein all of the memory is dedicated to the first pair of operating system instances and to the second pair of operating system instances.

3. A computer system according to claim 1 wherein at least some memory is dedicated to each operating system instance in the first pair of operating system instances and at least some memory is dedicated to each operating system instance in the second pair of operating system instances.

4. A computer system according to claim 3, further comprising:

a computer network; and means for connecting at least a portion of the private I/O circuitry in each of the soft partitions to the computer network.

5. A computer system according to claim 3 wherein at least some of the memory is shared among the first pair of operating system instances and the second pair of operating system instances.

6. A computer system according to claim 5, further comprising:

a computer network; and means for connecting at least a portion of the private I/O circuitry in each of the soft partitions to the computer network.

7. A computer system according to claim 5 wherein the shared part of memory comprises a shared cache-coherent memory.

8. A computer system according to claim 7 wherein the shared cache-coherent memory comprises a shared database cache.

9. A computer system according to claim 7 wherein the shared cache-coherent memory comprises a shared file system cache.

10. A computer system according to claim 7 wherein the shared cache-coherent memory comprises a shared lock cache.

11. A computer system according to claim 7 wherein the shared cache-coherent memory comprises a shared cluster interconnect.

12. A computer system according to claim 1, further comprising:

a software mechanism for tracking allocation of the plurality of system resources.

13. A computer system according to claim 12, wherein the software mechanism for tracking allocation includes a database that includes entries for the first sharing set and the second sharing set.

14. A computer system according to claim 1, further comprising:

a region of non-volatile memory configured to store data indicating allocation of the plurality of system resources.

15. A computer system according to claim 14, wherein the software mechanism that divides at least the portion of the plurality of system resources into the plurality of partitions uses the data stored in the region of non-volatile memory to allocate the plurality of system resources upon a reboot of at least a part of the computer system.

16. A computer system according to claim 1, wherein the first pair of operating system instances sharing the first sharing set are comprised in a different soft partition from the second pair of operating system instances sharing the second sharing set.

17. A method for operating a computer system having a plurality of configurable system resources including processors, memory, and I/O circuitry different from the memory, the method comprising the steps of:

(a) electrically interconnecting hardware components including the processors, memory and I/O circuitry so that each processor has electrical access to all of the memory and at least some of the I/O circuitry, such that the memory is configurable to allow data access by any one or more of the processors;

(b) forming a plurality of soft partitions, each soft partition including at least one processor, some private memory and some private I/O circuitry;

(c) running at least one operating system instance in each soft partition;

(d) creating a first pair of operating system instances which share a first subset of the plurality of system resources as a first sharing set; and (e) creating a second pair of operating system instances which share a second subset of the plurality of system resources different from the first subset of operating system resources as a second sharing set;

(f) associating an affinity handle with each hardware component, said affinity handle specifies a configuration that is more optimal than other possible configurations.

18. A method according to claim 17 further comprising the step of:

(f) dedicating all of the memory to the first pair of operating system instances and to the second pair of operating system instances.

19. A method according to claim 17 further comprising the steps of:

(g) dedicating at least some memory to each operating system instance in the first pair of operating system instances; and (h) dedicating at least some memory to each operating system instance in the second pair of operating system instances.

20. A method according to claim 19, wherein the computer system further comprises a computer network, and the method further comprises the step of:

(i) connecting at least a portion of the private I/O circuitry in each of the soft partitions to the computer network.

21. A method according to claim 19 further comprising the step of:

(j) sharing at least some of the memory among the first pair of operating system instances and the second pair of operating system instances.

22. A method according to claim 21, wherein the computer system further comprises a computer network, and the method further comprises the step of:

(k) connecting at least a portion of the private I/O circuitry in each of the soft partitions to the computer network.

23. A method according to claim 21 wherein step (j) comprises the step of:

(j1) sharing a cache-coherent memory among the first pair of operating system instances and the second pair of operating system instances.

24. A method according to claim 23 wherein step (j1) comprises the step of:

(j1a) sharing a database cache among the first pair of operating system instances and the second pair of operating system instances.

25. A method according to claim 23 wherein step (j1) comprises the step of:

(j1b) sharing a file system cache among the first pair of operating system instances and the second pair of operating system instances.

26. A method according to claim 23 wherein step (j1) comprises the step of:

(j1c) sharing a lock cache among the first pair of operating system instances and the second pair of operating system instances.

27. A method according to claim 23 wherein step (j1) comprises the step of:

(j1d) sharing a cluster interconnect among the first pair of operating system instances and the second pair of operating system instances.

28. A method according to claim 17, further comprising the step of:

(l) tracking allocation of the plurality of system resources using software.

29. A method according to claim 28, wherein step (l) further comprises:

(l1) storing entries in a data base to track sharing sets.

30. A method according to claim 17, further comprising the step of:

(m) storing data indicating allocation of the plurality of system resources in a region of non-volatile memory.

31. A method according to claim 30, further comprising the steps of:

(n) rebooting at least part of the computer system;

(o) using the data stored in the region of the non-volatile memory to allocate the plurality of system resources in response to rebooting at least part of the computer system.

32. A method according to claim 17, wherein step (e) further comprises:

(e1) creating the second pair of operating system instances in a different software partition from the first pair of operating system instances.

33. A computer program product for operating a computer system having a plurality of configurable system resources including hardware components comprising processors, memory, and I/O circuitry different from the memory, and a mechanism for electrically interconnecting the processors, memory and I/O circuitry so that each processor has electrical access to all of the memory and at least some of the I/O circuitry, such that the memory is configurable to allow data access by any one or more of the processors, the computer program product comprising a computer usable medium having computer readable program code thereon including:

program code for forming a plurality of soft partitions, each soft partition including at least one processor, some private memory and some private I/O circuitry;

program code for running at least one operating system instance in each soft partition;

program code for creating a first pair of operating system instances which share a first subset of the plurality of system resources as a first sharing set;

program code for creating a second pair of operating system instances which share a second subset of the plurality of system resources different from the first subset of operating system resources as a second sharing set; and program code for associating an affinity handle with each hardware component, said affinity handle specifies a configuration that is more optimal than other possible configurations.

34. A computer program product according to claim 33 further comprising program code for dedicating all of the memory to the first pair of operating system instances and to the second pair of operating system instances.

35. A computer program product according to claim 33 further comprising:

program code for dedicating at least some memory to each operating system instance in the first pair of operating system instances; and program code for dedicating at least some memory to each operating system instance in the second pair of operating system instances.

36. A computer program product according to claim 35, wherein the computer system further comprises a computer network, and the computer program product further comprises:

program code for connecting at least a portion of the private I/O circuitry in each of the soft partitions to the computer network.

37. A computer program product according to claim 35 further comprising program code for sharing at least some of the memory among the first pair of operating system instances and the second pair of operating system instances.

38. A computer program product according to claim 37, wherein the computer system further comprises a computer network, and the computer program product further comprises:

program code for connecting at least a portion of the private I/O circuitry in each of the soft partitions to the computer network.

39. A computer program product according to claim 37 wherein the program code for sharing at least some of the memory comprises program code for sharing a cache-coherent memory among the first pair of operating system instances and the second pair of operating system instances.

40. A computer program product method according to claim 39 wherein the program code for sharing cache-coherent memory comprises program code for sharing a database cache among the first pair of operating system instances and the second pair of operating system instances.

41. A computer program product according to claim 39 wherein the program code for sharing cache-coherent memory comprises program code for sharing a file system cache among the first pair of operating system instances and the second pair of operating system instances.

42. A computer program product according to claim 39 wherein the program code for sharing cache-coherent memory comprises program code for sharing a lock cache among the first pair of operating system instances and the second pair of operating system instances.

43. A computer program product according to claim 39 wherein the program code for sharing cache-coherent memory comprises program code for sharing a cluster interconnect among the first pair of operating system instances and the second a pair of operating system instances.

44. A computer program product according to claim 33, further comprising:

program code for tracking allocation of the plurality of system resources.

45. A computer program product according to claim 44, wherein the program code for tracking allocation further comprises program code for storing entries in a data base to track sharing sets.

46. A computer program product according to claim 33, further comprising:

program code for storing data indicating allocation of the plurality of system resources in a region of non-volatile memory.

47. A computer program product according to claim 46, further comprising:

program code for using the data stored in the region of the non-volatile memory to allocate the plurality of system resources in response to rebooting at least part of the computer system.

48. A computer program product according to claim 33, wherein the program code for creating the second pair of operating system instances further comprises program code for creating the second pair of operating system instances in a different soft partition from the first pair of operating system instances.

* * * * *